United States Patent
Chen et al.

(10) Patent No.: US 12,474,572 B2
(45) Date of Patent: Nov. 18, 2025

(54) METHOD AND DEVICE OF DESIGNING METASURFACE AND STORAGE MEDIUM

(71) Applicant: SHENZHEN METALENX TECHNOLOGY CO., LTD, Shenzhen (CN)

(72) Inventors: Jianfa Chen, Shenzhen (CN); Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 244 days.

(21) Appl. No.: 18/536,258

(22) Filed: Dec. 12, 2023

(65) Prior Publication Data
US 2024/0202947 A1   Jun. 20, 2024

(30) Foreign Application Priority Data
Dec. 15, 2022   (CN) .......................... 202211620572.0

(51) Int. Cl.
*G02B 27/00* (2006.01)
*G02B 1/00* (2006.01)
(Continued)

(52) U.S. Cl.
CPC ......... *G02B 27/0012* (2013.01); *G02B 1/002* (2013.01); *G06T 7/514* (2017.01);
(Continued)

(58) Field of Classification Search
CPC .... G02B 27/48; G02B 19/0014; G02B 26/10; G02B 19/0085; G02B 27/095; G02B 19/0052; G02B 19/0095; G02B 1/002; G02B 19/0028; G02B 19/0057; G02B 19/0066; G02B 26/105; G02B 27/0961; G02B 2005/1804; G02B 27/0012; G02B 27/0927; G02B 5/1828; G02B 5/18;
(Continued)

(56) References Cited

U.S. PATENT DOCUMENTS

2023/0194857 A1* 6/2023 Feng .................... G02B 5/1866
                                                                          359/566
2024/0418907 A1* 12/2024 Hu ........................ H04N 23/69

OTHER PUBLICATIONS

Raeker, Brian O., and Anthony Grbic. "Compound Metaoptics for Amplitude and Phase Control of Wavefronts." arXiv preprint arXiv: 1807.05461 (2018). (Year: 2018).*

* cited by examiner

*Primary Examiner* — Xiao M Wu
*Assistant Examiner* — Scott E Sonners
(74) *Attorney, Agent, or Firm* — JCIPRNET

(57) ABSTRACT

A method and a device of designing a metasurface, and a storage medium are provided. The method includes determining a phase distribution of an initial metasurface according to a preset image and a light source function of a first light source; the preset image includes a plurality of projection points in an array; performing a simulation based on the phase distribution of the initial metasurface and a second light source, so as to obtain a speckle image; if the speckle image does not meet a preset standard, optimizing the phase distribution of the initial metasurface through adjusting the projection points on the preset image, so as to determine a target phase distribution; generating the metasurface according to the target phase distribution.

19 Claims, 15 Drawing Sheets

(51) Int. Cl.
*G06T 7/514* (2017.01)
*G06T 7/521* (2017.01)
*G06T 15/04* (2011.01)

(52) U.S. Cl.
CPC .............. *G06T 7/521* (2017.01); *G06T 15/04* (2013.01); *G06T 2215/12* (2013.01)

(58) Field of Classification Search
CPC .............. G02B 5/1871; G02B 21/0056; G02B 2207/101; G02B 26/106; G02B 27/0172; G02B 27/0944; G02B 1/118; G06K 7/10722; G06K 7/10732; G06K 7/146; H01S 5/02325; H01S 5/005; G06T 7/0004; G06T 2207/10081; G06T 2207/30004; G06T 2207/30164; G06T 5/70; G06T 2207/10116; G06T 7/0002; G06T 11/001; G06T 7/0006; G06T 7/514; G06T 7/521; G06F 30/20
See application file for complete search history.

101 — determine a phase distribution of an initial metasurface according to a preset image and a light source function of a first light source; where the preset image represents a distribution schematic of speckles to be projected on a projection plane, and the preset image includes a plurality of projection points in an array; a position of each projection point in the preset image is the same as a position of a center of each pattern projected on the projection plane; the first light source refers to a light source used in a design of the initial metasurface

102 — perform a simulation based on the phase distribution of the initial metasurface and a second light source, so as to obtain a speckle image; where the second light source refers to a light source used in a measurement of the initial metasurface; the speckle image represents speckle patterns projected on the projection plane, obtained by passing light emitted by the second light source through the initial metasurface

103 — if the speckle image does not meet a preset standard, optimize the phase distribution of the initial metasurface through adjusting the projection points on the preset image, so as to determine a target phase distribution; generate the metasurface according to the target phase distribution

FIG. 1

METHOD AND DEVICE OF DESIGNING METASURFACE AND STORAGE MEDIUM

CROSS-REFERENCE TO RELATED APPLICATION

This application claims the priority benefit of Chinese Patent Application serial no. 202211620572.0, filed on Dec. 15, 2022. The content of the aforementioned application, including any intervening amendments thereto, is incorporated herein by reference in its entirety.

TECHNICAL FIELD

The present disclosure relates to the field of generation of structured light, in particular to a method and a device of designing a metasurface, and a storage medium.

BACKGROUND

A structured light projection system is a system consisting of a projection device and a detection device. Generally, the projection device projects specific light information onto object surfaces. The detection device captures light information reflected by the object surfaces. Whereby, according to variation of light signals caused by the object, information of the object such as the position and the depth of the object can be calculated, even an entire three-dimensional space can be restored. The structured light module usually project speckles in a large area. However, when the projected speckles have poor projection effect, the detection device may fail to detect speckles that are reflected by the object surfaces, since the light intensity of some speckles is lower than a detectable threshold, which results in information loss, thereby seriously affecting the spatial reconstruction of the object.

SUMMARY

In order to solve the aforementioned problem that the projected speckles have poor projection effect, a method and a device of designing a metasurface, and a storage medium are provided according to embodiments of the present disclosure.

In a first aspect of the present disclosure, a method of designing a metasurface is provided. The method includes: determining a phase distribution of an initial metasurface according to a preset image and a light source function of a first light source; the preset image represents a distribution schematic of speckles to be projected on a projection plane, and the preset image includes a plurality of projection points in an array; a position of each projection point in the preset image is the same as a position of a center of each pattern projected on the projection plane; the first light source refers to a light source used in a design of the initial metasurface; performing a simulation based on the phase distribution of the initial metasurface and a second light source, so as to obtain a speckle image; the second light source refers to a light source used in a measurement of the initial metasurface; the speckle image represents speckle patterns projected on the projection plane, obtained by passing light emitted by the second light source through the initial metasurface; if the speckle image does not meet a preset standard, optimizing the phase distribution of the initial metasurface through adjusting the projection points on the preset image, so as to determine a target phase distribution; generating the metasurface according to the target phase distribution.

In an embodiment, the first light source emits a plane wave, and the second light source is a light source array including at least one light source.

In an embodiment, a step of determining the phase distribution of the initial metasurface according to the preset image and the light source function of the first light source includes: processing the preset image and the plane wave by a G-S algorithm or an iterative Fourier transform algorithm, so as to determine a diffraction phase distribution of the initial metasurface; superimposing a collimation phase distribution on the diffraction phase distribution to obtain the phase distribution of the initial metasurface.

In an embodiment, the initial metasurface includes a plurality of nanostructures; the collimation phase distribution satisfies:

$$\varphi_{i,1} = -\frac{2\pi}{\lambda}\left(\sqrt{r_i^2 + f^2} - f\right);$$

where, $\varphi_{i,1}$ represents a phase of an i-th nanostructure at a distance $r_i$ from a central point of the initial metasurface, and i=1, 2 . . . , n, n is a positive integer; $\lambda$ represents an operating wavelength of the initial metasurface; f represents a distance between the initial metasurface and a focal plane of the initial metasurface.

In an embodiment, the preset standard includes a requirement that a light intensity distribution of speckles in the speckle image is uniform.

In an embodiment, each projection point has a numerical value, the numerical value of one projection point represents a light intensity coefficient of each speckle of one speckle pattern, with a position of the one projection point corresponding to a position of the one speckle pattern projected on the projection plane;
if the speckle image does not meet the preset standard, a step of optimizing the phase distribution of the initial metasurface by adjusting the projection points of the preset image, includes:
if the light intensity distribution of the speckles in the speckle image is not uniform, optimizing the phase distribution of the initial metasurface by varying numerical values of the projection points of the preset image.

In an embodiment, a step of optimizing the phase distribution of the initial metasurface by varying the numerical values of the projection points of the preset image includes:
performing a first loop optimization on the initial metasurface to obtain an optimized initial metasurface, until a speckle image that corresponds to the optimized initial metasurface meets the preset standard.

In an embodiment, the first loop optimization includes:
varying numerical values of a portion of projection points of the preset image used to obtain the initial metasurface with positions of the portion of projection points corresponding to a region of the speckle image which does not meet the preset standard, so as to obtain an updated preset image;
based on the updated preset image and the light source function of the first light source, updating the phase distribution of the initial metasurface, so as to obtain an updated phase distribution of the initial metasurface;
performing a simulation based on the updated phase distribution of the initial metasurface and the second light source, so as to obtain an updated speckle image;

verifying whether a light intensity distribution of speckles in the updated speckle image is uniform; if the light intensity distribution of the speckles in the updated speckle image is uniform, taking the updated phase distribution of the initial metasurface as the target phase distribution.

In an embodiment, a step of verifying whether the light intensity distribution of the speckles in the updated speckle image is uniform includes:

if a normalized light intensity difference corresponding to light intensities of the speckles in the updated speckle image is less than a preset threshold, confirming that the light intensity distribution of the speckles in the updated speckle image is uniform; and the normalized light intensity difference is a uniformity parameter which indicates whether the light intensity distribution of the speckles in the updated speckle image is uniform.

In an embodiment, the normalized light intensity difference satisfies:

$$A = \frac{I_{max} - I_{min}}{I_{max} + I_{min}} \times 100\%;$$

where, A represents the normalized light intensity difference; $I_{max}$ represents a maximum light intensity among the light intensity distribution of the speckles in the updated speckle image; $I_{min}$ represents a minimum light intensity among the light intensity distribution of the speckles in the updated speckle image.

In an embodiment, the preset standard includes a requirement that speckles in the speckle image are evenly distributed.

In an embodiment, if the speckle image does not meet the preset standard, a step of optimizing the phase distribution of the initial metasurface by adjusting the projection points of the preset image, includes:

if the speckles in the speckle image are not evenly distributed, optimizing the phase distribution of the initial metasurface by adjusting a distance between adjacent projection points of the preset image.

In an embodiment, a step of optimizing the phase distribution of the initial metasurface by adjusting the distance between adjacent projection points of the preset image, includes:

performing a second loop optimization on the initial metasurface to obtain an optimized initial metasurface, until a speckle image that corresponds to the optimized initial metasurface meets the preset standard.

In an embodiment, the second loop optimization includes:

adjusting the distance between the adjacent projection points of the preset image used to obtain the initial metasurface, so as to obtain an updated preset image;

based on the updated preset image and the light source function of the first light source, updating the phase distribution of the initial metasurface, so as to obtain an updated phase distribution of the initial metasurface;

performing a simulation based on the updated phase distribution of the initial metasurface and the second light source, so as to obtain an updated speckle image;

verifying whether speckles in the updated speckle image are evenly distributed; if the speckles in the updated speckle image are evenly distributed, taking the updated phase distribution of the initial metasurface as the target phase distribution.

In an embodiment, a step of optimizing the phase distribution of the initial metasurface further includes:

optimizing the phase distribution of the initial metasurface by adjusting a focal length of the initial metasurface.

In an embodiment, a step of performing the simulation based on the phase distribution of the initial metasurface and the second light source to obtain the speckle image, includes:

keeping the second light source at a focal plane of the initial metasurface.

In a second aspect of the present disclosure, a device of designing a metasurface is provided. The device includes a determination module, a simulation module and an optimization module;

the determination module is configured to determine a phase distribution of an initial metasurface according to a preset image and a light source function of a first light source; the preset image represents a distribution schematic of speckles to be projected on a projection plane, and the preset image includes a plurality of projection points in an array; a position of each projection point in the preset image is the same as a position of a center of each pattern projected on the projection plane; the first light source refers to a light source used in a design of the initial metasurface;

the simulation module is configured to perform a simulation based on the phase distribution of the initial metasurface and a second light source, so as to obtain a speckle image; the second light source refers to a light source used in a measurement of the initial metasurface; the speckle image represents speckle patterns projected on the projection plane, obtained by passing light emitted by the second light source through the initial metasurface;

the optimization module is configured to optimize the phase distribution of the initial metasurface through adjusting the projection points on the preset image if the speckle image does not meet a preset standard, so as to determine a target phase distribution; and the optimization module is also configured to generate the metasurface according to the target phase distribution.

In a third aspect of the present disclosure, an electronic device is provided. The electronic device includes a processor and a memory. The memory includes a computer program stored in the memory. The computer program is executed by the processor, so as to implement the method of the first aspect of the present disclosure.

A fourth aspect of the present disclosure provides a non-transitory computer-readable storage medium. A computer program is stored in the storage medium. The computer program is executed by a processor, so as to implement the method of the first aspect of the present disclosure.

In a fifth aspect of the present disclosure, a computer program product is provided. The computer program product includes a computer program. The computer program is executed to implement the method of designing the metasurface of any one of feasible designs of the first aspect of the present disclosure.

In the embodiment of the first aspect of the present disclosure, a phase distribution of an initial metasurface is firstly determined according to a preset image and a first light source. Then, a simulation based on the phase distribution of the initial metasurface and a second light source is performed to obtain a speckle image. In the case that the speckle image does not meet a preset standard, the preset image is optimized by adjusting projection points on the preset image, so as to optimize the phase distribution of the initial metasurface. The aforementioned optimization is a loop optimization process which is iteratively performed until the speckle image obtained by the simulation meets the preset standard. The method provided herein essentially adjusts the preset image, so that the metasurface to be designed has a required modulation phase. By the combination of the simulation and speedy optimization, a phase distribution of the initial metasurface that meets the expected requirements, such as the target phase distribution, is obtained. Sequentially, based on the target phase distribution, the metasurface is generated, and the generated metasurface projects speckles with better performance.

In order to make the above-mentioned objects, features and advantages of the present disclosure more obvious and understandable, preferred embodiments of the present disclosure will be given below and described in detail with reference to the accompanying drawings.

BRIEF DESCRIPTION OF THE DRAWINGS

In order to explain embodiments of the present disclosure or the prior art more clearly, drawings used in the description of the embodiments or the prior art will be briefly explained below. Obviously, the following drawings are merely for exemplary and explanatory purposes. It is understood by those skilled in the art that without paying any creative efforts, other drawings are available based on the following drawings.

FIG. 1 shows a flow chart of a method of designing a metasurface according to an embodiment of the present disclosure.

DETAILED DESCRIPTION OF DISCLOSURED EMBODIMENTS

It should be understood that terms used in the present disclosure, such as "central", "longitudinal", "transverse", "length", "width", "thickness", "upper", "lower", "front", "rear", "left", "right", "vertical", "horizontal", "top", "bottom", "interior", "exterior", "clockwise", "counterclockwise" which are intended to indicate orientational or positional relationships based on the accompanying drawings are only for the purpose of describing the present disclosure conveniently and simply, and are not intended to indicate or imply a particular orientation, a structure and an operation in a particular orientation of the device or element referred to herein, and thus are not to be interpreted as a limitation to the present disclosure.

In addition, terms "first" and "second" are used for descriptive purposes, and are not intended to indicate or imply relative importance or implicitly indicate the quantity of the indicated technical features. Therefore, features defined by "first" or "second" may explicitly or implicitly include one or more of these features. In the description of the present disclosure, "plurality" or "multiple" means that there are two or more of these features, unless otherwise explicitly and specifically defined.

In the present disclosure, unless otherwise clearly stated and defined, terms "assemble", "connect", "joint", "fix" and the like should be understood in a broad sense. For example, these terms may be referred to as "fixedly connect", "detachably connect", or "integrally connected"; these terms may also be referred to as "mechanically connect" or "electrically connect"; these terms may be further referred to as "directly connect", "indirectly connected by an intermediary" or "communicated between an interior of an element and an interior of another element". It is understandable to a person having ordinary skill in the art that the above terms are interpreted according to specific scenarios of the present disclosure.

According to an embodiment of the present disclosure, a method of designing a metasurface is provided. The metasurface to be designed is capable of projecting speckles. Referring to FIG. 1, the method of designing the metasurface includes the following steps 101-103.

Step 101: determining a phase distribution of an initial metasurface according to a preset image and a light source function of a first light source; the preset image represents a distribution schematic of speckles to be projected on a projection plane, and the preset image includes a plurality of projection points in an array. A position of each projection point in the preset image is the same as a position of a center of each pattern projected on the projection plane. The first light source refers to a light source used in a design of the initial metasurface.

Figure 2:
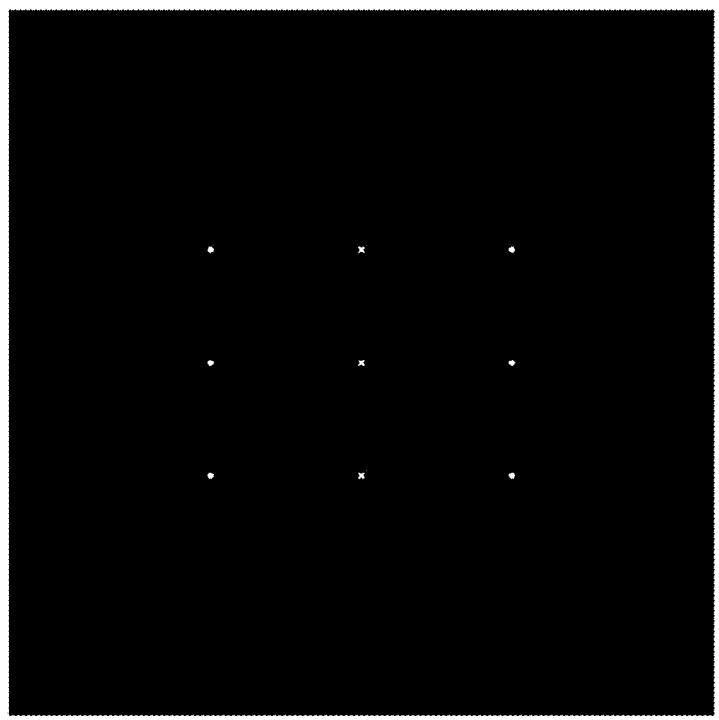
FIG. 2 shows a schematic diagram of a preset image involved in the method of designing the metasurface according to an embodiment of the present disclosure.

In the present embodiment, the preset image is a basic pattern to be designed according to actual needs. For example, the preset image may be a basic pattern to be designed according to product requirements. The preset image represents a distribution schematic of speckles to be projected on the projection plane. Specifically, the preset image uses a plurality of projection points to schematically represent the distribution of speckles. The number of projection points represents the number of speckle patterns that are ultimately projected on the projection plane. The patterns are related to light source which is actually selected. For example, the patterns may represent a pattern that corresponds to the selected light source. Where, the plurality of projection points are arranged in an array, as shown in FIG. 2. The preset image shown in FIG. 2 includes nine projection points arranged in a 3×3 array. That is, based on the preset image shown in FIG. 2, the number of replicated speckle patterns that corresponds to the selected light source is nine. Respective replicated speckle patterns are projected on the projection plane in an arrangement corresponding to an arrangement of the projection points in the preset image, so as to form speckles. It should be noted that a position of a center of each replicated speckle pattern (i.e., a pattern corresponding to the light source) projected on the projection plane is the same as a position of each projection point in the preset image. In other words, each projection point represents a center of each pattern projected on the projection plane, and each projection point corresponds to a replicated zone.

In the present embodiment, the initial metasurface represents a metasurface obtained based on a preset image of an initial moment. The first light source refers to a light source used to determine (such as calculate) the phase distribution of the initial metasurface. Where, the first light source may be a light source array. It should be noted that in the present embodiment, a point light source is also referred to as a light source array, that is, the light source array mentioned herein may be a point light source or a patterned array including a plurality of point light sources. In the case that the light source array includes one point light source, a speckle image finally formed by diffraction include light points in an M×N array, which coincide with the projection points arranged in an M×N array in the preset image. In the case that the light source array is a patterned array, the speckle image finally formed by diffraction is expanded (such as replicated) into patterned speckles in a large area, with the patterned speckles being arranged in an M×N matrix array. For example, the first light source may be a VCSEL (Vertical-Cavity Surface-Emitting Laser) array. Or, the first light source may emit a plane wave, for example, the first light source may be a light source that is capable of emitting collimated light in parallel.

Where, the phase distribution of the initial metasurface is calculated according to the light source function of the first light source and the preset image. The phase distribution of the initial metasurface may be a diffraction phase distribution that is calculated directly and used to realize the diffraction (i.e., obtain diffraction speckles). Or, the phase distribution of the initial metasurface may be an overall phase distribution. For example, based on the calculated diffraction phase distribution, a further calculation is made to determine the phase distribution (i.e., the overall phase distribution) of the initial metasurface, so that the phase distribution of the initial metasurface realizes not only the diffraction function, but also other functions, such as a collimation function.

For example, in the case that the first light source is a light source array, the phase distribution of the initial metasurface is directly determined according to the preset image and a light source function of the light source array. Or, in the case that the first light source emits the plane wave, the diffraction phase distribution of the initial metasurface is determined according to the preset image and a light source function of the plane wave, and is directly used as the phase distribution of the initial metasurface. Or, in the case that the first light source emits the plane wave, the diffraction phase distribution of the initial metasurface is determined according to the preset image and the light source function of the plane wave, and then is further processed to obtain the phase distribution (i.e., the overall phase distribution) of the initial metasurface. In the present embodiment, the first light source is designed to emit the plane wave, because the inventor found in actual design activities that using the light source array as the first light source may lead to problems, for example, in the process of the calculation of the overall phase distribution of the initial metasurface directly based on the light source function of the light source array and in the process of taking the overall phase distribution as the phase distribution of the initial metasurface, it is found that the calculation of the phase distribution of the initial metasurface is relatively slow, and the obtained phase distribution of the initial metasurface does not have a high accuracy, causing subsequently-generated speckles to have burrs with very sharp end teeth. Based on these problems, it is preferred in the present embodiment that the first light source emits the plane waves.

Figure 3:
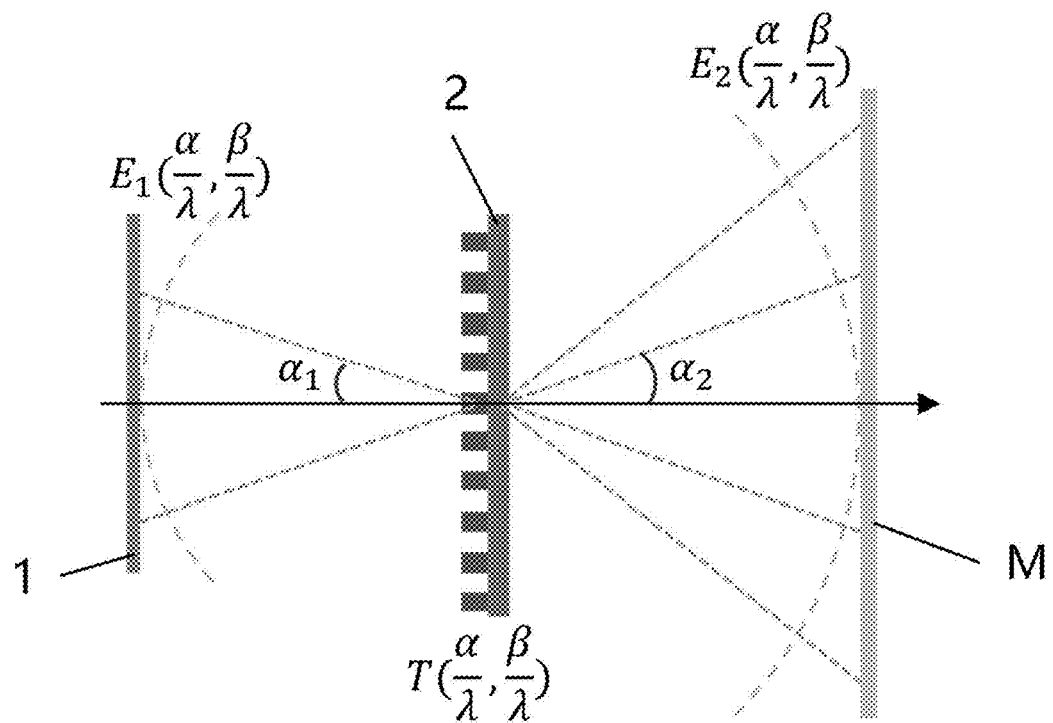
FIG. 3 is a principle diagram of projecting speckles by the metasurface according to a method of designing a metasurface in an embodiment of the present disclosure.

It should be noted that a method of calculating the phase distribution of the initial metasurface by the light source function of the first light source and the preset image in the present embodiment includes: performing a convolution calculation on the light source function of the first light source and the preset image. The principle is that a process of diffracting the incident light into speckles by the metasurface conforms to diffraction laws. Specifically, the light emission from the first light source to the metasurface is regarded as a first diffraction in the present embodiment. A process of propagating light emitted from the first light source to the metasurface, then modulating the light into speckles by the metasurface and projecting the speckles towards the projection plane is regarded as a second diffraction. Both of the first diffraction and the second diffraction conform to the diffraction laws, which can be explained by diffraction formulas, for example, the Fresnel diffraction formula or the Fraunhofer diffraction formula. In the present embodiment, the Harvey non-paraxial diffraction formula is used to finally obtain results of the first diffraction and the second diffraction. The results are expressed by the following formula:

$$E_2\left(\frac{\alpha}{\lambda}, \frac{\beta}{\lambda}\right) = E_1\left(\frac{\alpha}{\lambda}, \frac{\beta}{\lambda}\right) \otimes T\left(\frac{\alpha}{\lambda}, \frac{\beta}{\lambda}\right);$$

where, $\otimes$ represents a convolution calculation. Referring to FIG. 3, FIG. 3 is a principle diagram of projecting speckles by the metasurface and FIG. 3 also shows an angular spectrum distribution on a vertical cross section of a principal optical axis of the metasurface. Where, a straight line with an arrow depicted in FIG. 3 represents the principal optical axis; a cross section of the principal optical axis that is perpendicular to a horizontal plane where the principal optical axis locates and that perpendicularly penetrates the metasurface is referred to as the vertical cross section of the principal optical axis. Specifically, a reference numeral 1 shown in FIG. 3 represents a first light source (or an emission plane thereof). Light emitted by the first light source has a wavelength of $\lambda$. After free propagation, the light emitted by the first light source reaches a plane (indicated by a reference numeral 2 in FIG. 3) where the metasurface locates, thereby obtaining an angular spectrum distribution $$E_1\left(\frac{\alpha}{\lambda}, \frac{\beta}{\lambda}\right)$$

of a light field corresponding to the first diffraction on the plane where the metasurface locates. Where, both of $\alpha$ and $\beta$ are independent variables and respectively represent an angle. For example, $\alpha$ may be any value, and $\alpha$ is a projection angle of a connection line in a horizontal direction with reference to FIG. 3; $\beta$ is a projection angle of the connection line in a vertical direction with reference to FIG. 3; where, the connection line mentioned herein refers to a line connecting a point on a cross section plane of the principal optical axis and a center of the metasurface. It is noted that $\beta$ is equal to zero, which is not shown in FIG. 3. $\alpha_1$ shown in FIG. 3 represents an angle between the principal optical axis and a line connecting any point on an emission plane of the first light source and the center of the metasurface. Then, on the basis of the angular spectrum distribution $$E_1\left(\frac{\alpha}{\lambda}, \frac{\beta}{\lambda}\right)$$

of the light field corresponding to the first diffraction, an angular spectrum distribution $$T\left(\frac{\alpha}{\lambda}, \frac{\beta}{\lambda}\right)$$

corresponding to the diffraction phase distribution t(x,y) is superimposed thereon. Namely, the angular spectrum distribution $T(\alpha/\lambda, \beta/\lambda)$ is an angular spectrum distribution of the preset image, i.e., a basic pattern corresponding to the second diffraction. By the second diffraction, the projected speckles reach the projection plane (i.e., a plane marked with M shown in FIG. 3). Finally, an angular spectrum distribution $E_2 (\alpha/\lambda, \beta/\lambda)$ of a light field of the speckles propagated to the projection plane is obtained. As shown in FIG. 3, $\alpha_2$ represents an angle between the principal optical axis and a line connecting any point on the projection plane and the center of the metasurface.

Based on this, it is determined that the speckle image is formed by convolving the light source function of the first light source and the preset image (i.e., an image corresponding to the diffraction phase distribution). In the present embodiment, the phase distribution of the initial metasurface is optimized by adjusting the projection points of the preset image.

Step 102: A simulation based on the phase distribution of the initial metasurface and a second light source is performed, so as to obtain a speckle image. The second light source represents a light source used to test the initial metasurface. The speckle image represents speckle patterns projected on the projection plane, obtained by passing light emitted by the second light source through the initial metasurface.

Figure 4:
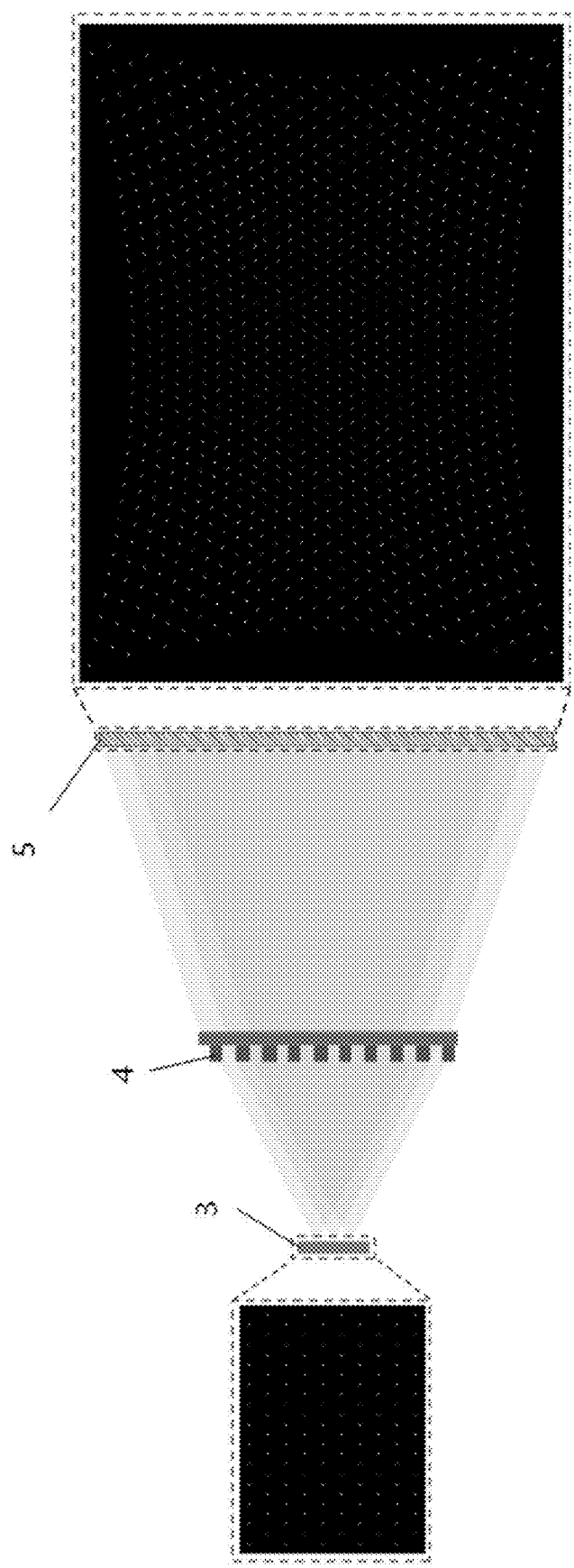
FIG. 4 is a schematic diagram showing the acquisition of a speckle image by a simulation based on a second light source and a phase distribution of an initial metasurface according to a method of designing a metasurface in an embodiment of the present disclosure.

In the present embodiment, the phase distribution of the initial metasurface is used to modulate light emitted by the second light source. It is understood that the second light source refers to a light source used in a measurement of the initial metasurface. For example, the second light source illuminates the initial metasurface which is obtained by simulation based on the phase distribution of the initial metasurface, so as to project an emerging light (it is noted that the aforementioned process is a simulation process), thereby testing out whether the projected speckles meet the preset standard after the emerging light is modulated by the phase distribution of the initial metasurface obtained in step 101. FIG. 4 depicts the aforementioned process. In FIG. 4, a reference numeral 3 refers to the second light source; a reference numeral 4 refers to the initial metasurface, and a reference numeral 5 refers to the projection plane, i.e., a plane where the speckle image lies. The second light source may be the same as the first light source, for example, both of the first light source and the second light source are light source arrays (such as point light sources); or both of the first light source and the second light source may be a light source emitting the plane wave (such as light source arrays having collimation functions). In addition, the second light source may be different from the first light source. For example, the first light source may be the light source emitting the plane wave, and the second light source may be the light source array. The present embodiment is not limited thereto. It should be noted that the second light source is also a light source used to illuminate the finally generated metasurface, that is, the second light source and the generated metasurface together constitute a device for emitting structured light.

Specifically, the simulation is performed by the use of the second light source and the phase distribution of the initial metasurface, so as to obtain a simulation result. The simulation result is an image of speckles actually projected on the projection plane, which is referred to as the speckle image. For example, in the case that the first light source is the light source array, the above-mentioned step 101 leaves the acquisition of the overall phase distribution, that is, the phase distribution of the initial metasurface. Subsequently, the light source array may also be selected as the second light source. The simulation based on the phase distribution of the initial metasurface and the second light source is performed to obtain the speckle image. Or, in the case that the first light source is the light source of emitting the plane wave, the above-mentioned step 101 leaves the acquisition of the diffraction phase distribution used to realize diffraction, and the diffraction phase distribution is used as the phase distribution of the initial metasurface. Subsequently, a light source array that is capable of emitting a collimated beam is selected as the second light source. The simulation based on the phase distribution (i.e., the diffraction phase distribution) of the initial metasurface and the second light source is performed to obtain the speckle image.

Step 103: If the speckle image does not meet a preset standard, optimizing the phase distribution of the initial metasurface through adjusting the projection points on the preset image, so as to determine a target phase distribution; generating the metasurface according to the target phase distribution.

In the present embodiment, the simulation of the above-mentioned step 102 results in the speckle image that is obtained after light from the second light source passes through the initial metasurface. In the case that the speckle image is verified not to meet the preset standard, for example, in the case that speckles shown in the speckle image have poor projection effect, the projection pints of the preset image are adjusted to optimize the preset image, so as to iteratively update and optimize the generated phase distribution of the initial metasurface, until the projected speckle image meets the preset standard after light from the second light source is modulated by the optimized phase distribution of the initial metasurface. A phase distribution of the initial metasurface which is capable of projecting a speckle image that meets the preset standard is taken as a finally-optimized phase distribution, i.e., the target phase distribution. Next, the metasurface is generated according to the target phase distribution. Where, the generated metasurface is capable of projecting speckles that meet the preset standard.

In the present embodiment, a process of generating the metasurface based on the target phase distribution may include: determining parameter requirements of the metasurface to be designed including an operating wavelength, material parameters, transmittance; performing parametric scanning during the nanostructure simulation, so as to obtain a corresponding relationship between nanostructures in different sizes or in different design and modulation phases and further obtain a nanostructure database with discrete phases; according to the obtained target phase distribution, searching the nanostructure database to select and arrange nanostructures which meet phase modulation requirements, thereby completing the design of the metasurface, such that, the metasurface that is actually used is constructed and fabricated.

In the method of designing the metasurface according to the present embodiment, a phase distribution of an initial metasurface is firstly determined according to a preset image and a first light source. Then, a simulation based on the phase distribution of the initial metasurface and a second light source is performed to obtain a speckle image. In the case that the speckle image does not meet a preset standard, the preset image is optimized by adjusting projection points on the preset image, so as to optimize the phase distribution of the initial metasurface. The aforementioned optimization is a loop optimization process which is iteratively performed until the speckle image obtained by the simulation meets the preset standard. The method provided herein essentially adjusts the preset image, so that the metasurface to be designed has a required modulation phase. By the combination of the simulation and speedy optimization, a phase distribution of the initial metasurface that meets the expected requirements, such as the target phase distribution, is obtained. Sequentially, based on the target phase distribution, the metasurface is generated, and the generated metasurface projects speckles with better performance.

Generally, traditional devices of emitting structured light mainly consist of a light source, a collimating lens and a diffractive optical element (DOE). A light source with a certain divergence angle is collimated by the collimating lens and then irradiated onto the DOE, resulting in diffraction and producing patterned speckles, i.e., structured light. In order to compact a device of emitting structured light, it is better to integrate the collimating lens and the DOE into a single optical element. Based on this, the present embodiment adopts a metasurface having both of a collimation phase distribution and a diffraction phase distribution to realize collimation and diffraction functions. The designed metasurface and the light source together constitute a compact device of emitting the structured light. In the process of designing the metasurface, the inventor found based on the diffraction theoretical analysis that: for a collimated beam, a spatial distance of the DOE relative to the collimating lens is imposed on the collimated beam only in the form of a phase factor (i.e., a constant), which will not affect a light field distribution of the collimated beam irradiated on a surface of the DOE. Therefore, it is feasible to place the DOE close to the collimating lens, so as to infinitely reduce the distance between the DOE and the collimating lens. In addition, the collimation of the beam by the collimating lens also enables the phase modulation of the beam, thus, the present embodiment superimposes a modulation phase distribution (i.e., a collimation phase distribution) of the collimating lens and a phase distribution (i.e., a diffraction phase distribution) of the DOE, thereby integrating the collimating lens and the diffraction element together, and resulting in a metasurface having both of collimation and diffraction functions.

Figure 5:
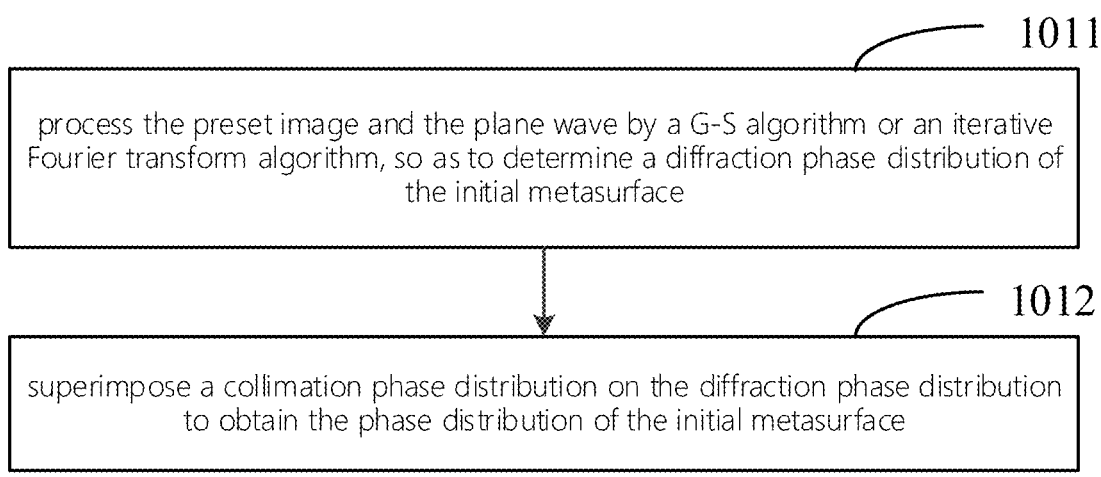
FIG. 5 shows a flow chart of determining the phase distribution of the initial metasurface according to a preset image and a light source function of a first light source according to a method of designing a metasurface in an embodiment of the present disclosure.

Optionally, the first light source emits a plane wave, and the second light source is a light source array including at least one light source. Referring to FIG. 5, a step of determining the phase distribution of the initial metasurface according to the preset image and the light source function of the first light source may include the following steps 1011-1012.

Step 1011: processing the preset image and the plane wave by a G-S algorithm or an iterative Fourier transform algorithm, so as to determine a diffraction phase distribution of the initial metasurface.

In the present embodiment, the first light source is designed to be a light source of emitting a plane wave, so the light source function of the first light source is a light source function of the plane wave. The second light source is designed to be different from the first light source, and the second light source is a light source array. By the G-S algorithm (Gerchberg-Saxton algorithm) or the iterative Fourier transform algorithm, the light source function of the plane wave (i.e., the light source function of the first light source) and the preset image are iteratively calculated, so as to obtain the diffraction phase distribution of the initial metasurface used to achieve diffraction.

Step 1012: superimposing a collimation phase distribution on the diffraction phase distribution to obtain the phase distribution of the initial metasurface.

Where, based on the above-mentioned diffraction theoretical analysis, the present embodiment further processes the diffraction phase distribution determined in the above step 1011, that is, the diffraction phase distribution and the collimation phase distribution are combined by superposition to obtain an overall phase distribution composed of the diffraction phase distribution and the collimation phase distribution. The overall phase distribution is used as the phase distribution of the initial metasurface, so that the light emitted by the second light source (such as the light source array) used in step 102 is modulated by the phase distribution of the initial metasurface to become collimated and to be projected into speckles, thereby obtaining the speckle image. It should be noted that a focal length of the initial metasurface is determined by the collimation phase distribution, thus, when the second light source is used to obtain the speckle image, a distance between the second light source and the initial metasurface is designed to be equal to the focal length of the initial metasurface.

In the present embodiment, during the calculation of the phase distribution of the initial metasurface, the first light source is designed to be a light source of emitting the plane wave. For example, the light incident on the initial metasurface is collimated light in parallel (i.e., light of emitting a plane wave). This method not only makes the setting of the light source function of the first light source easier and simpler, but also lowers the difficulty of calculating the phase distribution of the initial metasurface. The light source function of the plane wave and the preset image are used to directly calculate the phase distribution corresponding to the traditional DOE, that is, the diffraction phase distribution, thereby accelerating the calculation of the phase distribution. In addition, by this split-type calculation method, for example, by a method of calculating the diffraction phase distribution separately, the accuracy of the calculation is greatly improved.

Figure 6:
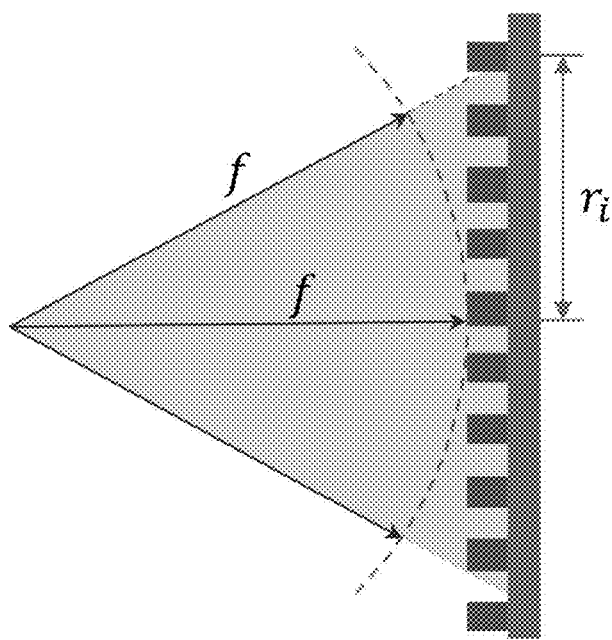
FIG. 6 schematically shows a path of light traveling from the first light source to the initial metasurface, where the first light source is a light source array which includes a point light source according to a method of designing a metasurface in an embodiment of the present disclosure.
Figure 7:
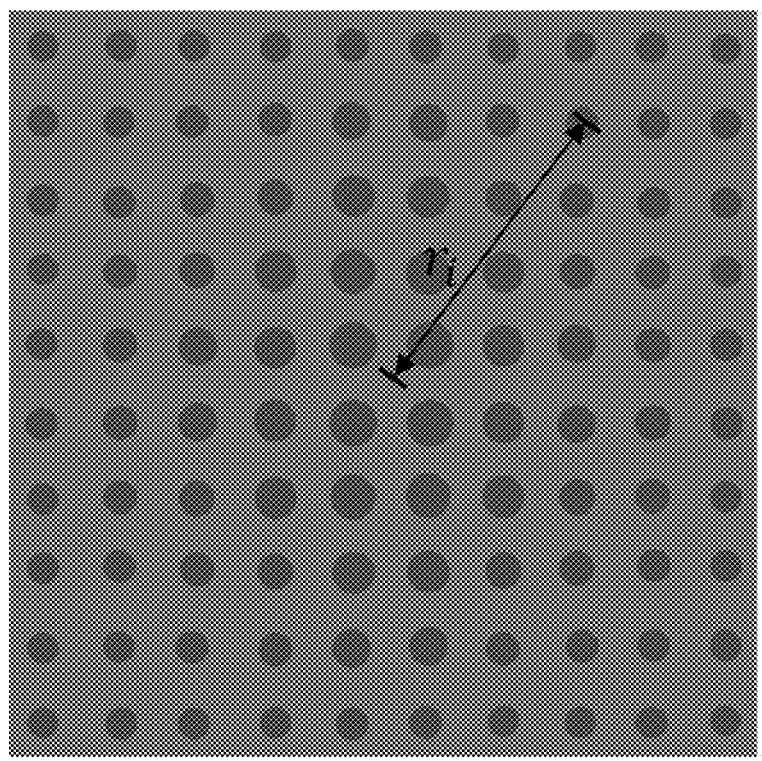
FIG. 7 depicts a top view of the initial metasurface involved according to a method of designing a metasurface in an embodiment of the present disclosure.

Optionally, referring to FIGS. 6 and 7, FIG. 6 schematically shows a path of light traveling from the first light source to the initial metasurface, where the first light source is a light source array which includes a point light source. FIG. 7 depicts a top view of the initial metasurface including a plurality of nanostructures. Dots shown in FIG. 7 represent the nanostructures. The collimation phase distribution satisfies:

$$\varphi_{i,1} = -\frac{2\pi}{\lambda}\left(\sqrt{r_i^2 + f^2} - f\right);$$

where, $\varphi_{i,1}$ represents a phase of an i-th nanostructure at a distance $r_i$ from a central point of the initial metasurface, and i=1, 2 ..., n, n is a positive integer; $\lambda$ represents an operating wavelength of the initial metasurface; f represents a distance between the initial metasurface and a focal plane of the initial metasurface, in other words, f is the focal length of the initial metasurface.

Based on the above-mentioned formula of the collimation phase distribution, the collimation phase distribution which is capable of collimating the incident light is calculated. For example, in the case that the second light source (such as the point light source) is arranged at the focal plane of the initial metasurface, the light with a divergence angle emitted by the second light source is modulated and projected by the initial metasurface having the above-mentioned collimation phase distribution into a collimated beam.

The inventor found that when the speckles obtained through the modulation of the metasurface illuminate an object to be tested, some of the speckles have relatively small light intensity, and due to the existence of these speckles, it is difficult to obtain optical information with sufficient intensity after the reflection. Or, for the case where the light intensity of the speckles is small, there are more stringent requirements for the sensitivity of a signal detector at a receiving end. Whereas, when the light intensity of the speckles obtained by the modulation of the metasurface is relatively uniform, reflected light signals can be completely received as much as possible while using a receiver with relatively low sensitivity. Based on this, it is necessary to enable the speckles generated by the metasurface to have a uniform light intensity distribution.

Optionally, each projection point has a numerical value. For example, the numerical value of each projection point is a non-zero value. The numerical value of one projection point represents a light intensity coefficient of each speckle of one speckle pattern, with a position of the one projection point corresponding to a position of the one speckle pattern projected on the projection plane. That is, the numerical value of the one projection point represents a light intensity of each speckle in one replicated zone of the projection plane, with the one replicated zone corresponding to the one projection point. The preset standard includes a requirement that a light intensity distribution of speckles in the speckle image is uniform. If the speckle image does not meet the preset standard, a step of optimizing the phase distribution of the initial metasurface by adjusting the projection points of the preset image, includes the following step A.

Step A: if the light intensity distribution of the speckles in the speckle image is not uniform, optimizing the phase distribution of the initial metasurface by varying numerical values of the projection points of the preset image.

Where, if the light intensity distribution of the speckles in the speckle image obtained based on the phase distribution of the initial metasurface and the second light source is not uniform, that is, if the light intensity distribution of the speckles is not uniform, the preset image used to calculate the phase distribution of the initial metasurface may be adjusted. Specifically, numerical values of the projection points of the preset image used to represent the light intensities of the speckles are adjusted, thereby adjusting the phase distribution of the initial metasurface. For example, the numerical value of each projection point in the preset image (i.e., an initial preset image) used to determine the phase distribution of the initial metasurface for the first time is set to 1. That is to say, light intensity coefficient values of respective speckles corresponding to respective projection points of the preset image are identical. In other words, the present embodiment presupposes an ideal situation in which the light intensity distribution of the speckles is uniform. In addition, the phase distribution of the initial metasurface determined based on the preset image (in which the numerical value of each projection point is 1) is used to modulate the light emitted by the second light source, and the speckle image is obtained by simulation. However, the speckle image generally deviates from the ideal situation. Thus, in the case that the light intensity distribution of the speckles in the speckle image is not uniform, it proves that the numerical values (all of which are equal to 1) of the projection points in the preset image of this round fail to enable the light intensity distribution of the projected speckles to be uniform. That is, the preset image of this round does not meet the preset standard. Thus, the numerical values of the projection points of the preset image need to be adjusted. For example, by reducing the numerical values of the projection points in the preset image corresponding to a region of the preset image with higher light intensity, and by increasing the numerical values of the projection points in the preset image corresponding to a region of the preset image with lower light intensity, the optimization of the phase distribution of the initial metasurface is realized.

The present embodiment designs the numerical values of the projection points in the preset image to correspondingly represent the light intensities of the speckles in the speckle image, and also optimizes the phase distribution of the initial metasurface obtained based on the preset image by adjusting the numerical values of the projection points in the preset image, thereby optimizing the light intensity distribution of the speckles in the speckle image. The aforementioned method has a simple process and does not require complicated optimization and adjustment methods. It is only needed to adjust the numerical values of the projection points to quickly achieve optimization.

Optionally, a step of "optimizing the phase distribution of the initial metasurface by varying the numerical values of the projection points of the preset image" in the above step A may include: performing a first loop optimization on the initial metasurface to obtain an optimized initial metasurface, until a speckle image that corresponds to the optimized initial metasurface meets the preset standard. The first loop optimization may include the following steps A1-A4.

Step A1: varying numerical values of a portion of projection points of the preset image used to obtain the initial metasurface, with positions of the portion of projection points corresponding to a region of the speckle image which does not meet the preset standard, so as to obtain an updated preset image.

Where, in the case that the speckle image does not meet the preset standard, for example, in the case that the light intensity distribution of the speckles of the speckle image is not uniform, it is feasible to vary the numerical values of a portion of projection points (located in the preset image) with positions of the portion of projection points corresponding to a region of the speckle image which does not have uniform light intensity distribution. For example, when the region of the speckle image has relatively high light intensity, the numerical values of projection points corresponding to this region are reduced. Or, when the region of the speckle image has relatively low light intensity, the numerical values of projection points corresponding to this region are increased, thereby obtaining an updated preset image, which is used to replace the preset image that is previously used to determine the phase distribution of the initial metasurface.

Step A2: updating the phase distribution of the initial metasurface based on the updated preset image and the light source function of the first light source.

Where, the method involved herein is the same as the above-mentioned step 101. By calculation (such as the convolution calculation) based on the updated preset image and the light source function of the first light source, the phase distribution of the initial metasurface corresponding to the updated preset image is updated, thereby replacing the phase distribution of the initial metasurface which fails to modulates and project the speckle image that meets the preset standard. The details thereof will not be repeated herein.

Step A3: performing a simulation based on the updated phase distribution of the initial metasurface and the second light source to determine the updated speckle image.

Where, the same method as in the above-mentioned step 102 is used to perform the simulation based on the second light source and the updated phase distribution of the initial metasurface, so as to obtain an updated speckle image, which will not be described again here.

Step A4: verifying whether a light intensity distribution of speckles in the updated speckle image is uniform; if the light intensity distribution of the speckles in the updated speckle image is uniform, taking the updated phase distribution of the initial metasurface as the target phase distribution.

In the present embodiment, after the updated speckle image is obtained, it is necessary to verify whether the updated speckle image of this round meets the preset standard. That is to say, it is necessary to verify whether the light intensity distribution of the speckles of the updated speckle image is uniform. If yes, it means that the optimization of the phase distribution of the initial metasurface is completed in this round, and the updated phase distribution of the initial metasurface of this round is the final optimization result, namely, the updated phase distribution is taken as the target phase distribution.

It should be noted that if the updated speckle image of this round still does not meet the preset standard, for instance, the light intensity distribution of the speckles modulated by the updated phase distribution of the initial metasurface is still not uniform, in this case, it is required to adjust the preset image again based on the speckle image (which does not meet the preset standard) of this round, until the obtained speckle image meets the preset standard, thereby iteratively performing the first loop optimization.

Optionally, a step of "verifying whether the light intensity distribution of the speckles in the updated speckle image is uniform" in the above step A4 may include: if a normalized light intensity difference corresponding to light intensities of the speckles in the updated speckle image is less than a preset threshold, confirming that the light intensity distribution of the speckles in the updated speckle image is uniform; and the normalized light intensity difference is a uniformity parameter which indicates whether the light intensity distribution of the speckles in the updated speckle image is uniform.

In order to verify whether the light intensity distribution of the speckles generated by the initial metasurface is uniform, the present embodiment designs the normalized light intensity corresponding to the speckles to represent the light intensity of the speckles corresponding to respective projection points. A normalized light intensity difference of the speckles of the speckle image is used as a standard to verify whether the light intensity of the speckles is uniform, and is used as a uniformity parameter of expressing the light intensity. Specifically, if the normalized light intensity difference corresponding to the light intensities of the speckles of the updated speckle image is less than a preset threshold (such as a standard value set according to an actual situation), it is determined that the light intensity distribution of the speckles of the updated speckle image is uniform, that is, the updated speckle image meets the preset standard.

Optionally, the normalized light intensity difference satisfies:

$$A = \frac{I_{max} - I_{min}}{I_{max} + I_{min}} \times 100\%;$$

where, A represents the normalized light intensity difference, which is an uniformity parameter used to indicate whether the light intensity distribution of the speckles of the updated speckle image is uniform; $I_{max}$ represents a maximum light intensity among the light intensity distribution of the speckles in the updated speckle image; $I_{min}$ represents a minimum light intensity among the light intensity distribution of the speckles in the updated speckle image.

Figure 8:
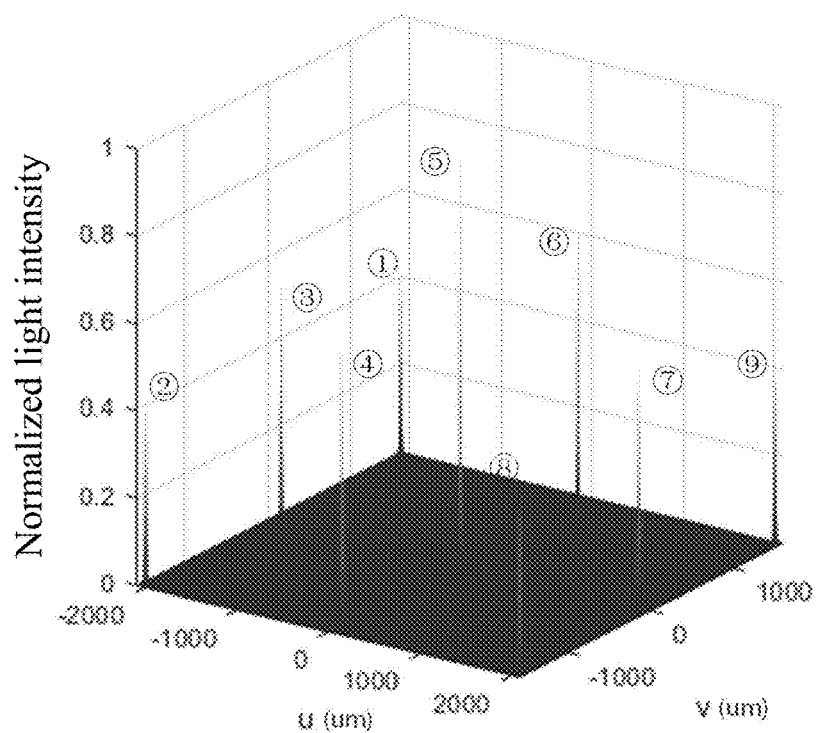
FIG. 8 is a schematic diagram of a light intensity distribution of the speckle image when numerical values of all projection points are equal to 1 according to a method of designing a metasurface in an embodiment of the present disclosure.
Figure 9:
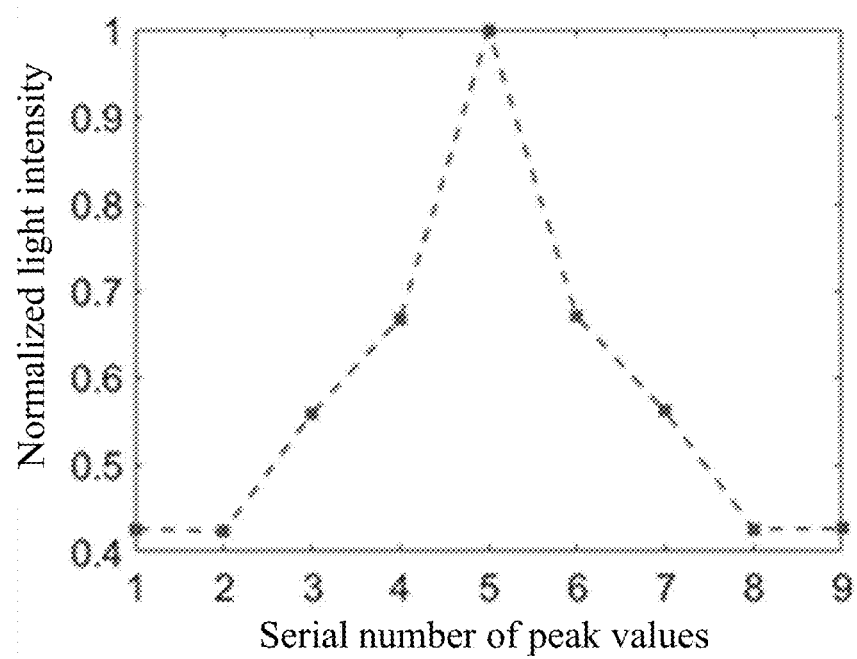
FIG. 9 schematically shows peak values of normalized light intensities of respective speckle of the speckle image according to a method of designing a metasurface in an embodiment of the present disclosure.
Figures 10, 11:
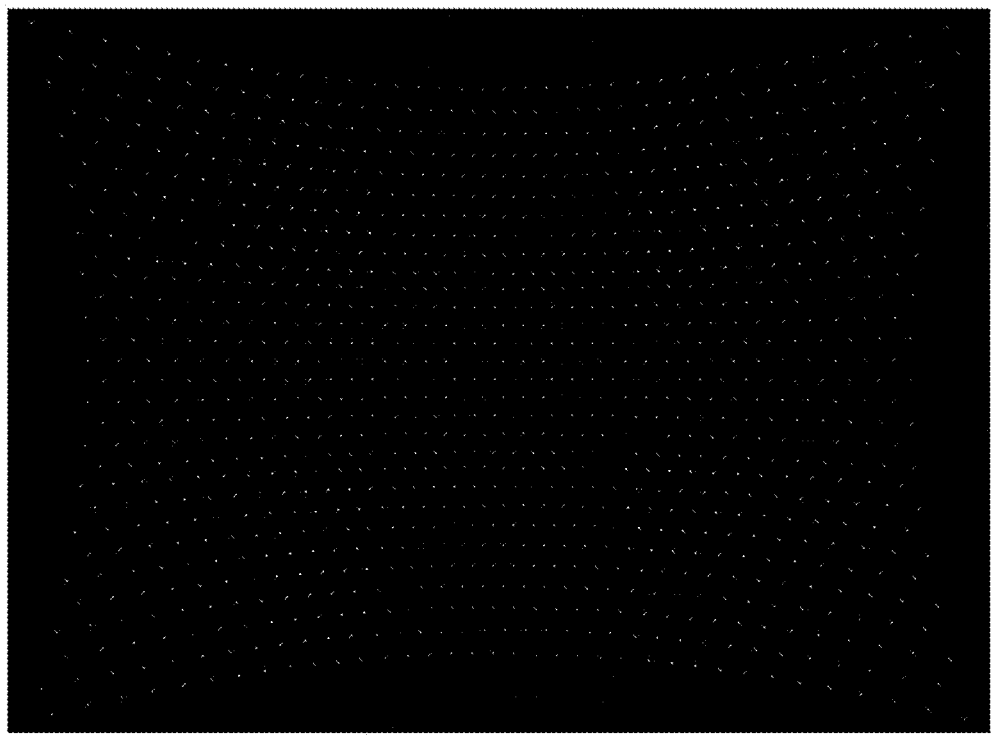
FIG. 10 shows a speckle image obtained by simulation when numerical values of projection points are equal to 1 according to a method of designing a metasurface in an embodiment of the present disclosure.
FIG. 11 is a comparison diagram of numerical values of the projection points before and after the adjustment according to a method of designing a metasurface in an embodiment of the present disclosure.

It is known from this formula that a smaller light intensity difference between the maximum light intensity and the minimum light intensity indicates a better light intensity uniformity of the speckles of the speckle image. That is, in the present embodiment, the use of the above-mentioned formula to calculate the normalized light intensity difference is capable of verifying whether the light intensity distribution of the speckles of the updated speckle image is uniform. For example, taking the case where a light source array (first light source) including a single point light source is used to project a 3×3 array as shown in FIG. 2 by an initial metasurface, the diffraction phase distribution is calculated based an ideal preset image (in which each projection point is assigned with a numerical value of 1), and then is combined with the collimation phase distribution by superposition to obtain the phase distribution of the initial metasurface. Thereafter, a single point light source (i.e., the second light source with a wavelength of such as 940 nm) illuminates the initial metasurface, to obtain an image containing nine speckles similar to FIG. 2 at a distance of 5 mm from the initial metasurface. The light intensity distribution of the nine speckles is shown in FIG. 8. Circled numbers in FIG. 8 represent serial numbers of peak values of light intensities of respective speckles. Due to the diffraction effect, the normalized light intensity of one speckle decreases with the distance between the one speckle and a center of the speckle image increases. Peak values of the normalized light intensities of respective speckles are shown in FIG. 9. In addition, in full view of the light intensities of all projection points, peak values have a large span of from 0.4 to 1. The speckle image is shown in FIG. 10.

Figure 12:
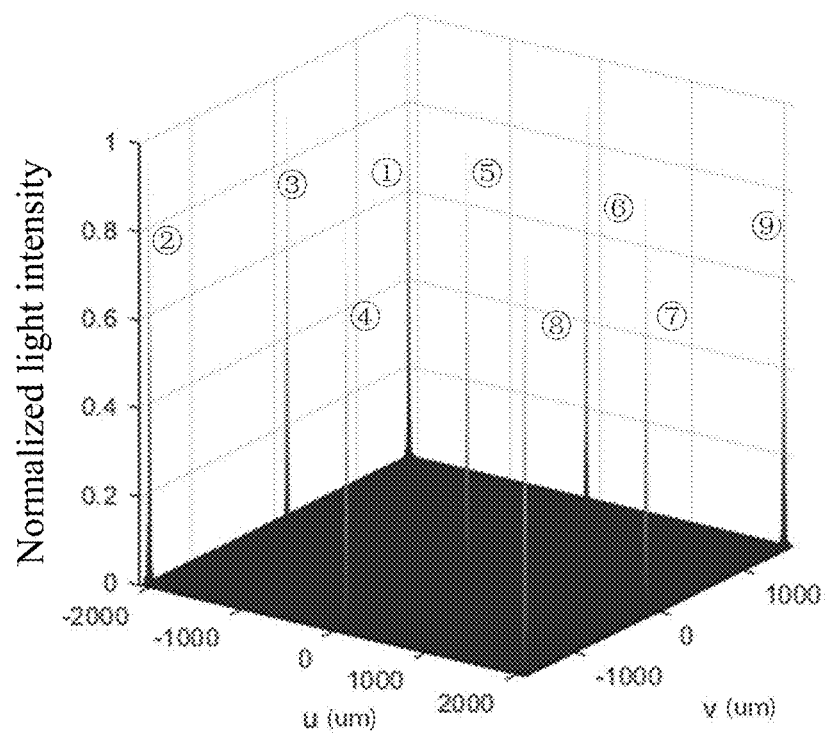
FIG. 12 schematically shows a light intensity distribution of an updated speckle image according to a method of designing a metasurface in an embodiment of the present disclosure.
Figure 13:
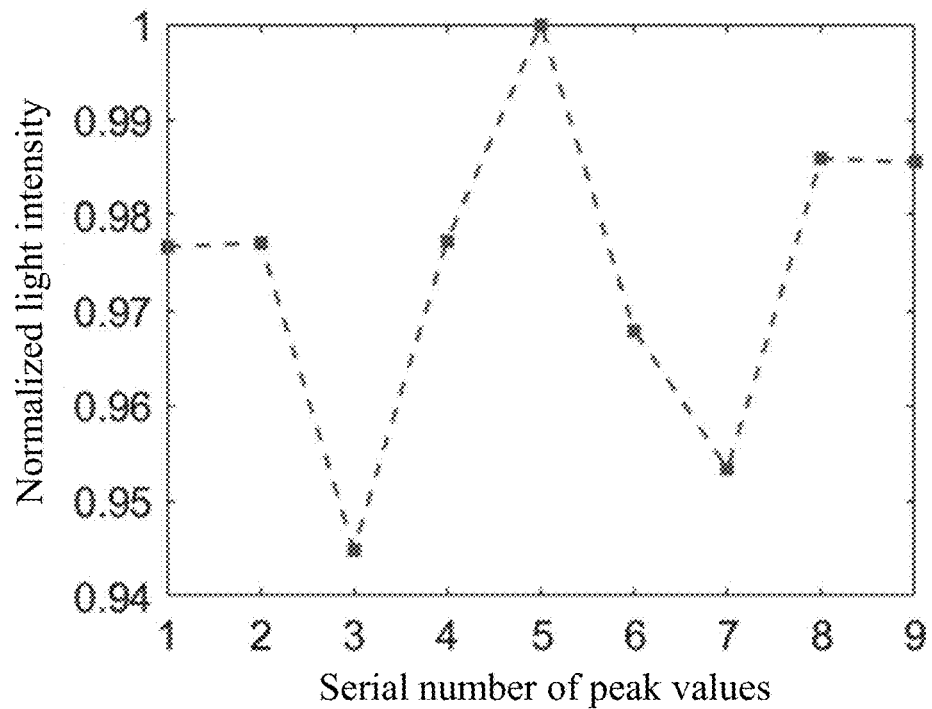
FIG. 13 schematically shows peak values of normalized light intensities of respective speckles of the updated speckle image according to a method of designing a metasurface in an embodiment of the present disclosure.
Figure 14:
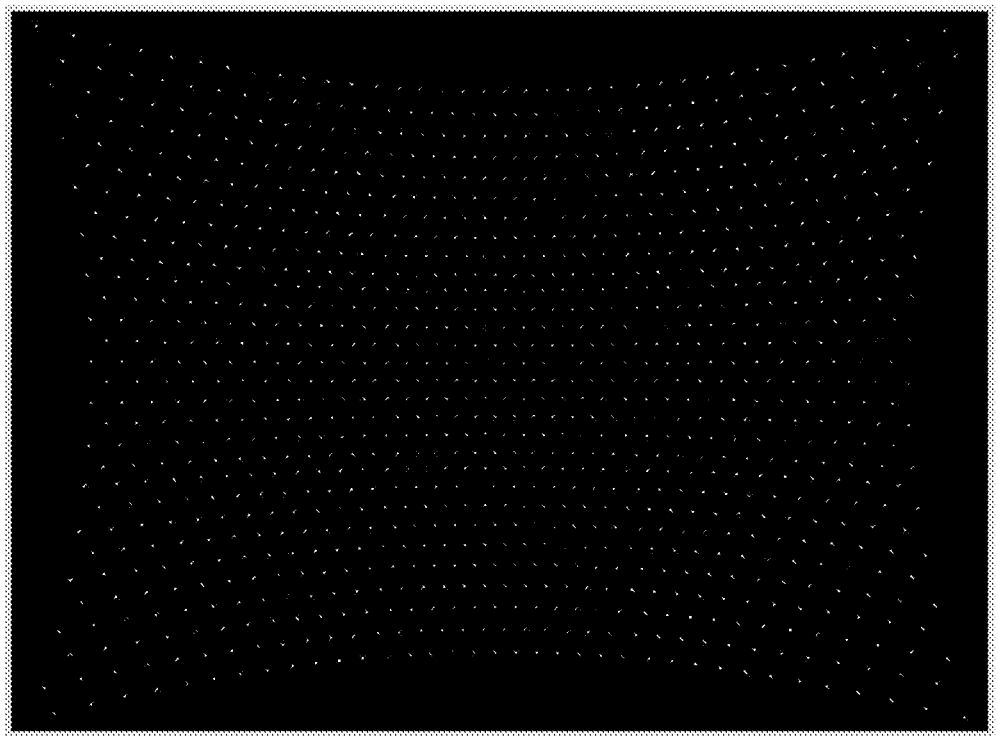
FIG. 14 schematically shows a light intensity distribution of the updated speckle image after adjusting numerical values of the projection points according to a method of designing a metasurface in an embodiment of the present disclosure.

If the present embodiment sets the preset threshold to be 5%, that is to say, when A is calculated to be less than 5%, it is determined that the light intensity distribution of the speckles of the speckle image is uniform. The normalized light intensity difference A corresponding to the speckles of the speckle image shown in FIG. 10 is calculated to be equal to 40.52%, which confirms that the light intensity uniformity of the speckles projected by the initial metasurface is poor. Based on this, steps A1 to A3 mentioned above are performed to adjust the numerical values of the projection points of the preset image from a left situation of FIG. 11 to a right situation of FIG. 11, so as to obtain the updated speckle image. Referring to FIGS. 12 and 13, FIG. 12 is a schematic diagram of the light intensity distribution of the updated speckle image, and FIG. 13 is a schematic diagram of peak values of the normalized light intensities of respective speckles of the updated speckle image. In the present embodiment, the normalized light intensity difference A of the speckles of the updated speckle image is calculated to be 2.83%, being less than 5%. That is, the light intensity distribution of the speckles of the updated speckle image is uniform. The updated speckle image is shown in FIG. 14.

It should be noted that the numerical values of the projection points are varied to adjust peak values of light intensities of the speckles of the speckle image, which follows the diffraction effect and does not meet a linear variation. A programmable software such as MATLAB may be used to write an objective function optimization algorithm for reducing the uniformity parameter A (i.e., the normalized light intensity difference), which is integrated into the entire simulation process to complete the adjustment of the light intensities of the speckles. In addition, when light intensities of speckles in a specific region are required to meet a specific distribution for certain actual detection scenarios, it is only needed to modify the objective function of the optimization algorithm, so as to meet the detection requirement.

The present embodiment expresses the light intensity uniformity of the speckles by the formula of the normalized light intensity difference, whereby the light intensity distribution of the speckles is quantified. By the calculation of the normalized light intensity difference, it is verified whether the light intensity distribution of the speckles is uniform. The aforementioned method is simple in the whole process and it is intuitive to verify if the light intensity distribution is uniform.

In addition, the inventor also found that a distance between respective projection points of the preset image affects the splicing of speckles in respective replicated zones after diffraction, such as, a size of a field of view is affected. Therefore, the present embodiment adjusts the distance between respective projection points, so as to adjust distances of speckles in respective zones after diffraction, thereby enabling the speckles to have the uniform distribution in space. That is, a distance between edge points of adjacent replicated zones should be consistent with a distance between points inside the replicated zones (or the distance between the edge points of adjacent replicated zones is 0.9 to 1.1 times the distance between points inside the zone). As shown in FIG. 14, the speckles of the updated speckle image are relatively uniform in spatial distribution and have a large field of view.

Optionally, the preset standard includes a requirement that the speckles of the speckle image are evenly distributed. The step of "if the speckle image does not meet the preset standard, optimizing the phase distribution of the initial metasurface by adjusting the projection points of the preset image" as mentioned in step 103 may include the following step B.

Step B: if the speckles in the speckle image are not evenly distributed, optimizing the phase distribution of the initial metasurface by adjusting a distance between adjacent projection points of the preset image.

Figure 15:
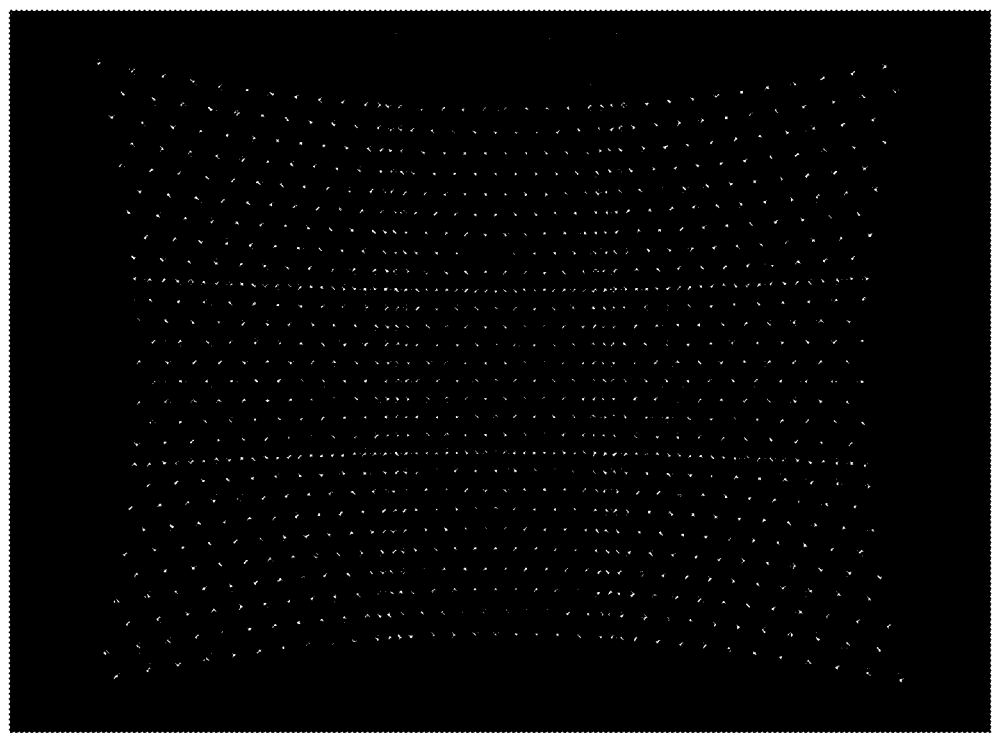
FIG. 15 is a schematic diagram of a speckle image in which speckles of different replicated zones overlap due to small horizontal and vertical distances between the projection points of the preset image according to a method of designing a metasurface in an embodiment of the present disclosure.

Where, if the speckles in the speckle image obtained based on the phase distribution of the initial metasurface and the second light source are not evenly distributed, that is, the speckles in each replicated zone are not spliced well, for example, speckles of the adjacent replicated zones overlap at the edges, and a distance between speckles at edges of the adjacent replicated zones is quite different from distances between light points inside each replicated zone. As shown in FIG. 15, speckles (such as light points at the edge) of different replicated zones overlap due to small horizontal and vertical distances between the projection points of the preset image. In this case, the spatial distribution uniformity of the speckles is poor. In addition, since edges of the adjacent replicated zones overlap, an area of the speckle image shown in FIG. 15 is relatively small, implying that the field of view is relatively small.

In the present embodiment, the phase distribution of the initial metasurface used to modulate the incident light to obtain the speckle image is optimized in the case that the speckles of the speckle image are not evenly distributed. Specifically, the preset image that is used to calculate the phase distribution of the initial metasurface for projecting the speckle image is adjusted. More specifically, distances between respective projection points of the preset image are adjusted, thereby adjusting the phase distribution of the initial metasurface.

Optionally, a step of optimizing the phase distribution of the initial metasurface by adjusting the distance between adjacent projection points of the preset image may include: performing a second loop optimization on the initial metasurface to obtain an optimized initial metasurface, until a speckle image that corresponds to the optimized initial metasurface meets the preset standard. Specifically, the second loop optimization may include the following steps B1-B4.

Step B1: adjusting the distance between the adjacent projection points of the preset image used to obtain the initial metasurface, so as to obtain an updated preset image.

Where, in the case that the speckle image does not meet the preset standard, for example, when the speckles of the speckle image are not evenly distributed in space (which results in, for example, a small field of view), it is feasible to adjust distances between respective projection points (located in the preset image) corresponding to a region of the speckle image where the speckles are not evenly distributed in space. For example, by enlarging a distance between two projection points corresponding to two replicated zones of the speckle image with overlapping edges, the edges of speckles projected in the two replicated zones no longer overlap, thereby obtaining an updated preset image, with which the preset image that is previously used to determine the phase distribution of the initial metasurface is replaced.

Step B2: based on the updated preset image and the light source function of the first light source, updating the phase distribution of the initial metasurface, so as to obtain an updated phase distribution of the initial metasurface.

The phase distribution of the initial metasurface is updated according to the description of the aforementioned step A2, which will not be repeated herein.

Step B3: performing a simulation based on the updated phase distribution of the initial metasurface and the second light source, so as to obtain an updated speckle image.

The speckle image is updated according to the description of the aforementioned step A3, which will not be repeated herein.

Step B4: verifying whether speckles in the updated speckle image are evenly distributed; if the speckles in the updated speckle image are evenly distributed, taking the updated phase distribution of the initial metasurface as the target phase distribution.

When the present embodiment obtains an updated speckle image, it is needed to verify whether the updated speckle image of this round meets the preset standard, that is, it is needed to verify whether the speckles of the updated speckle image are evenly distributed, if yes, it means that the optimization of the phase distribution of the initial metasurface is completed in this round, and the updated phase distribution of the initial metasurface of this round is the final optimization result, namely, the updated phase distribution is taken as the target phase distribution.

It should be noted that the present embodiment may simultaneously perform the first loop optimization and the second loop optimization, when the projected speckles are required to have both of a uniform light intensity distribution and a uniform spatial position distribution. That is, the first loop optimization and the second loop optimization are simultaneously performed, and a phase distribution of the initial metasurface which enables the realization of the uniform light intensity distribution and the uniform spatial position distribution is used as the final optimization result (i.e., the target phase distribution). Or, the present embodiment may perform the first loop optimization and the second loop optimization in different sequences. For example, in the case that the speckles of the updated speckle image have the uniform light intensity distribution, it is further verified whether the speckles of the updated speckle image are evenly distributed in space. If yes, it means that the optimization of the phase distribution of the initial metasurface is completed in this round, and the updated phase distribution of the initial metasurface of this round is the final optimization result, namely, the updated phase distribution is taken as the target phase distribution.

It should be noted that if the updated speckle image of this round still does not meet the preset standard, for instance, the speckles modulated by the updated phase distribution of the initial metasurface are still not evenly distributed, in this case, it is required to adjust the preset image again based on the speckle image (which does not meet the preset standard) of this round, until the obtained speckle image meets the preset standard, thereby iteratively performing the second loop optimization.

Optionally, a step of "optimizing the phase distribution of the initial metasurface" in the above step 103 may include: optimizing the phase distribution of the initial metasurface by adjusting a focal length of the initial metasurface.

Where, in order to solve the problem that the speckles of the speckle image are not evenly distributed, the present embodiment may optimize the phase distribution of the initial metasurface by varying the focal length of the initial metasurface. Specifically, since the focal length is related to the collimation phase distribution used to realize the collimation function, as for the phase distribution of the initial metasurface including the collimation phase distribution and the diffraction phase distribution, a distance between the light source (such as the second light source) and the initial metasurface is a focal length corresponding the collimation phase distribution. It is known from the law of lens imaging that with the image distance keeping unchanged, the variation of the focal length of a lens alters the size of the formed clear image. In the present embodiment, enlarging the focal length that corresponds to the collimation phase distribution will cause respective speckle patterns of zones of the speckle image to shrink. In addition, the focal length is inversely proportional to the size of the speckle image. Based on this, it is feasible to adjust the focal length, so as to optimize the phase distribution of the initial metasurface.

Where, a step of "performing the simulation based on the phase distribution of the initial metasurface and the second light source to obtain the speckle image" in the above step 102 may include: keeping the second light source at a focal plane of the initial metasurface.

Figure 16:
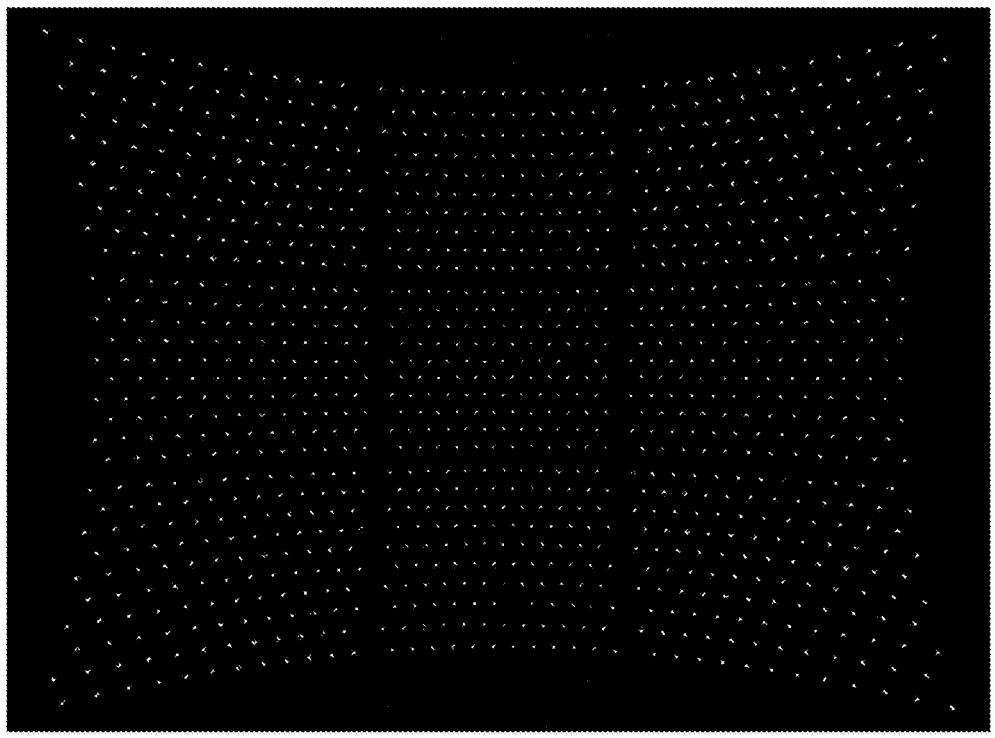
FIG. 16 shows a schematic diagram of the diminution of speckles in respective zones of the speckle image after the focal length increases from 2.46 mm to 2.6 mm according to a method of designing a metasurface in an embodiment of the present disclosure.

That is to say, after the phase distribution of the initial metasurface is optimized by varying the focal length, it is needed to arrange the second light source used for simulation at the focal plane of the updated initial metasurface when performing simulation based on the above step 102. Namely, a distance between the second light source and the updated initial metasurface is consistent with an adjusted focal length. For example, referring to FIGS. 15 and 16, the increase of the focal length from 2.46 mm (which corresponds to the embodiment of FIG. 15) to 2.6 mm (which corresponds to the embodiment of FIG. 16) will zoom out the speckles of respective zones of the speckle image. It should be noted that, on this basis, the distances between respective projection points of the preset image may also be appropriately adjusted so that the speckle edges of adjacent zones may be spliced together without overlapping, which further enables the speckles to be evenly distributed in space, thereby meeting the requirements for large field of view.

Figure 17:
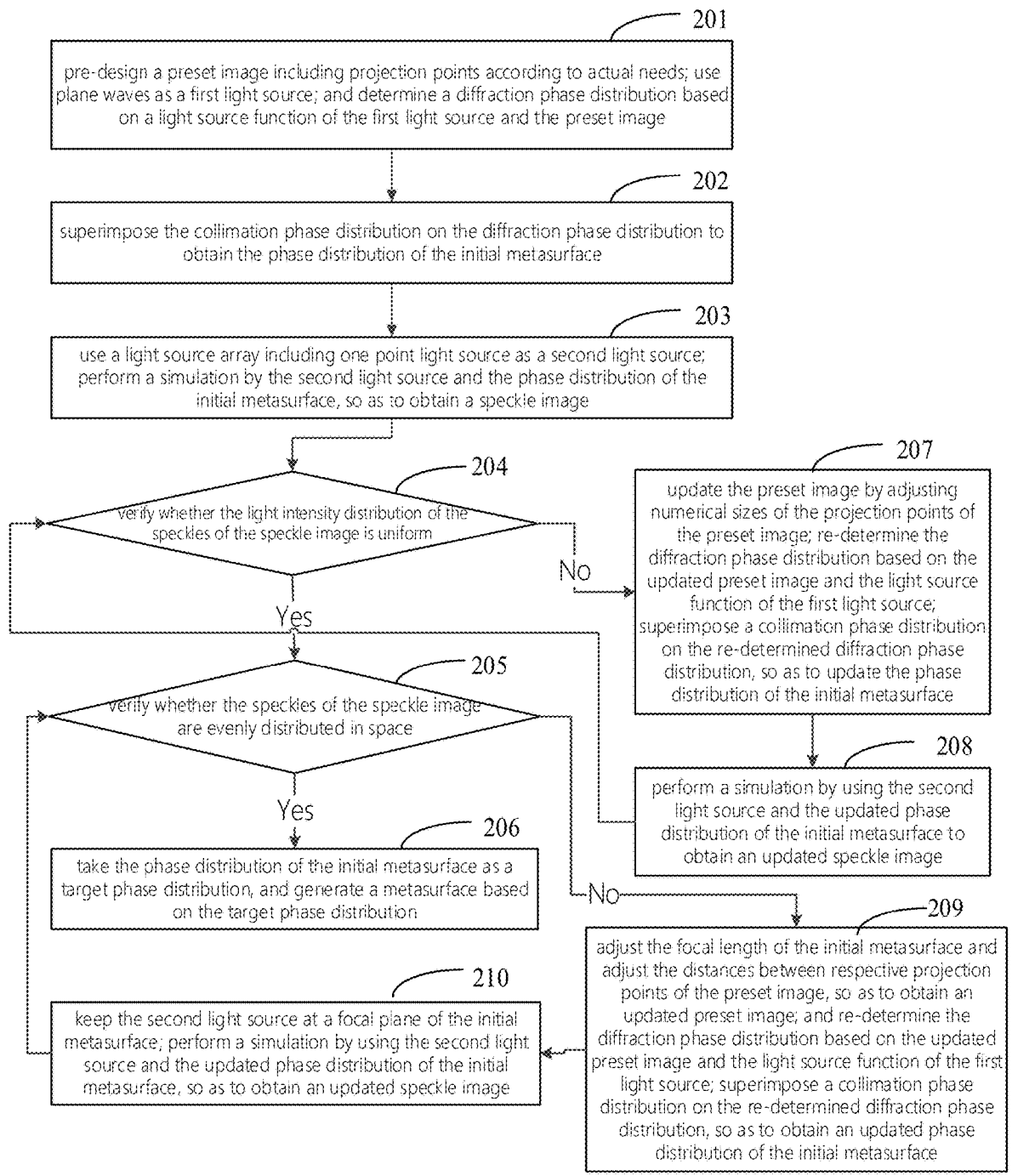
FIG. 17 shows a detailed flow chart of a method of designing a metasurface according to an embodiment of the present disclosure.

The following description explains in detail the flow of the method of designing the metasurface according to an embodiment, as shown in FIG. 17, the method includes the following steps 201-210.

Step 201: pre-designing a preset image including projection points according to actual needs; using plane waves as a first light source; and determining a diffraction phase distribution based on a light source function of the first light source and the preset image.

Figure 18:
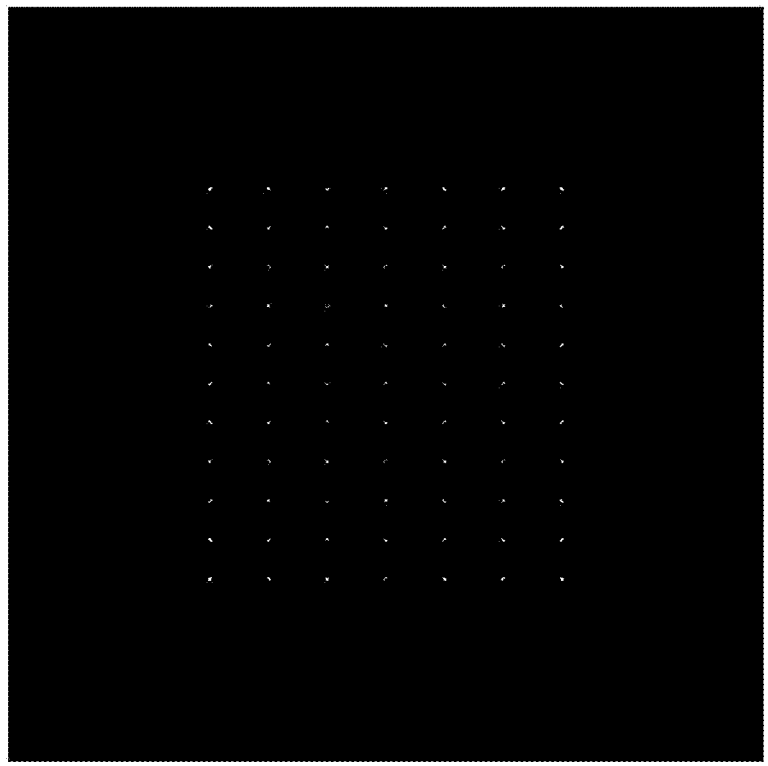
FIG. 18 schematically shows a preset image according to a method of designing a metasurface in an embodiment of the present disclosure.

Where, the preset image includes 77 projection points arranged in an 11×7 array, as shown in FIG. 18.

Step 202: superimposing the collimation phase distribution on the diffraction phase distribution to obtain the phase distribution of the initial metasurface.

Step 203: using a light source array as a second light source; performing a simulation by the second light source and the phase distribution of the initial metasurface, so as to obtain a speckle image.

Figure 19:
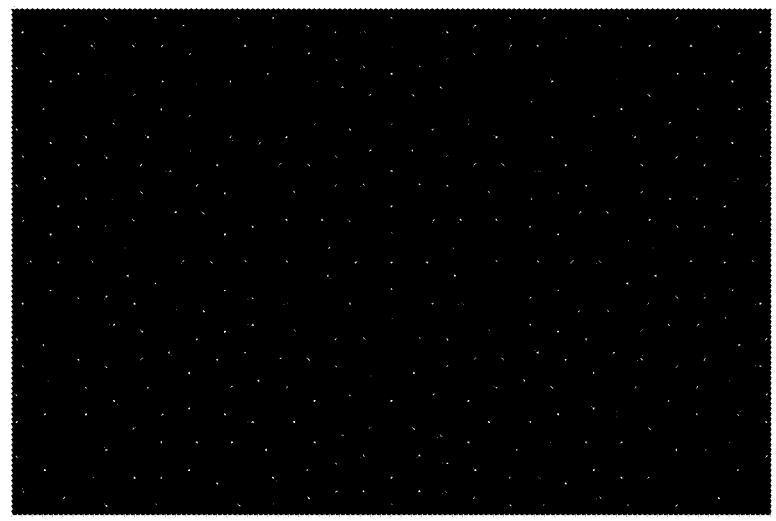
FIG. 19 schematically shows a second light source according to a method of designing a metasurface in an embodiment of the present disclosure.

Where, the second light source may include 391 random dot-matrix light sources with a wavelength of 940 nm. The second light source is schematically shown in FIG. 19.

Step 204: verifying whether the light intensity distribution of the speckles of the speckle image is uniform; if yes, proceeding to the step 205; if not, proceeding to the step 207.

Step 205: verifying whether the speckles of the speckle image are evenly distributed in space. If yes, proceeding to the step 206; if not, proceeding to the step 209.

Step 206: taking the phase distribution of the initial metasurface as a target phase distribution, and generating a metasurface based on the target phase distribution.

Figure 20:
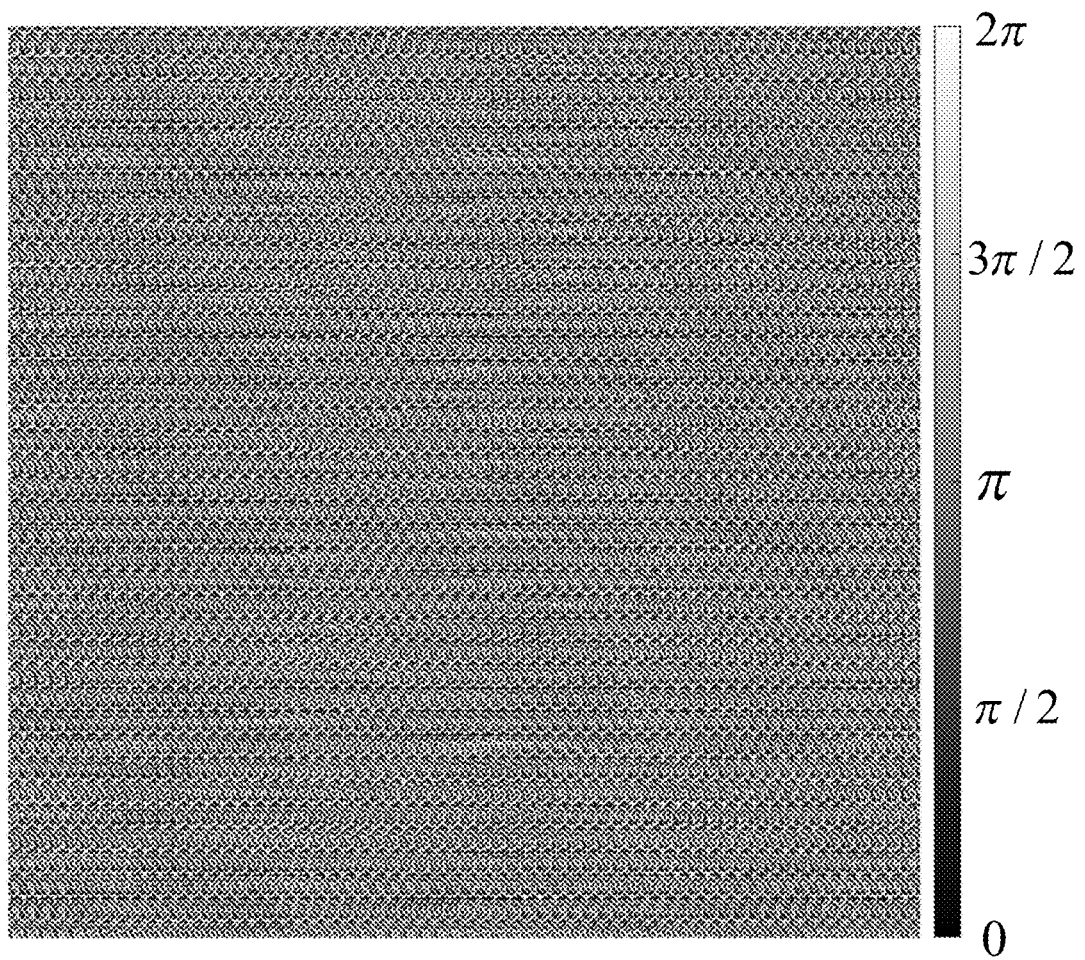
FIG. 20 schematically shows a target phase distribution according to a method of designing a metasurface in an embodiment of the present disclosure.
Figure 21:
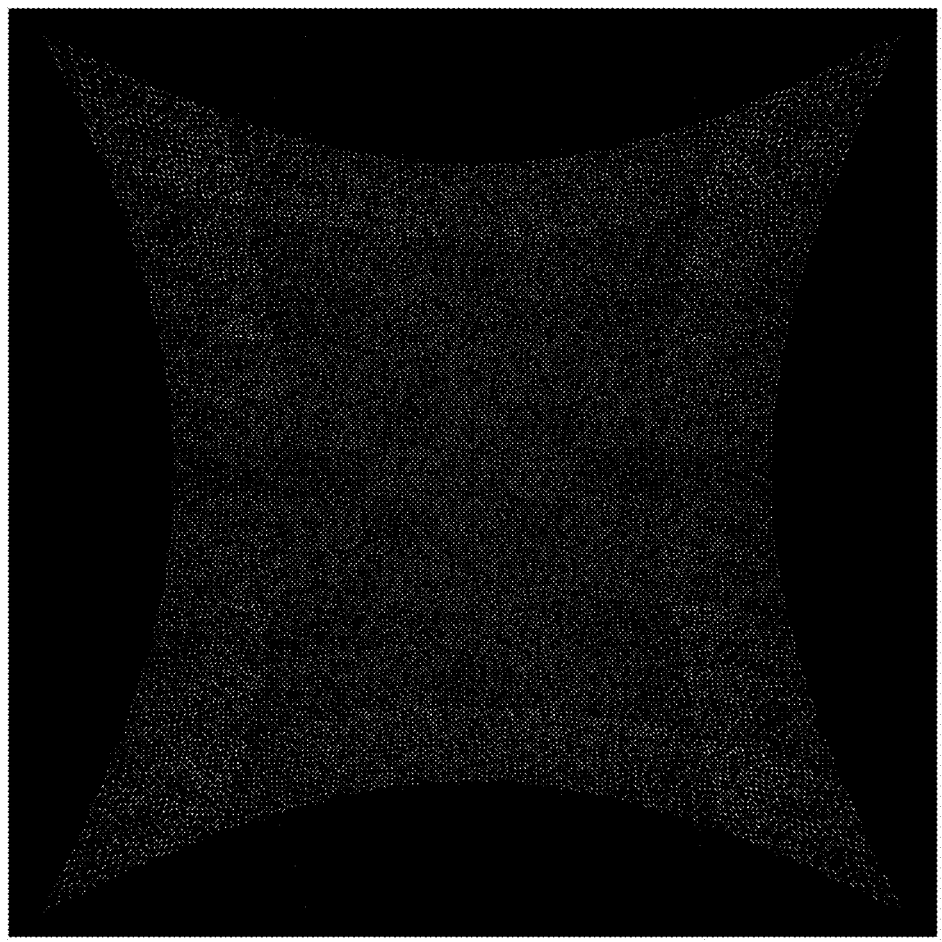
FIG. 21 schematically shows a speckle image according to a method of designing a metasurface in an embodiment of the present disclosure.

Where, the target phase distribution is schematically shown in FIG. 20. The metasurface is capable of projecting the light emitted by the second light source into speckles arranged in an 11×7 array (as shown in FIG. 21), which is referred to as the speckle image.

Step 207: updating the preset image by adjusting numerical values of the projection points of the preset image; re-determining the diffraction phase distribution based on the updated preset image and the light source function of the first light source; superimposing a collimation phase distribution on the re-determined diffraction phase distribution, so as to update the phase distribution of the initial metasurface.

Step 208: performing a simulation by using the second light source and the updated phase distribution of the initial metasurface to obtain an updated speckle image, and returning to the above step 204.

Step 209: adjusting the focal length of the initial metasurface and adjusting the distances between respective projection points of the preset image, so as to obtain an updated preset image; and re-determining the diffraction phase distribution based on the updated preset image and the light source function of the first light source; superimposing a collimation phase distribution on the re-determined diffraction phase distribution, so as to obtain an updated phase distribution of the initial metasurface.

Step 210: keeping the second light source at a focal plane of the initial metasurface; performing a simulation by using the second light source and the updated phase distribution of the initial metasurface, so as to obtain an updated speckle image; returning to the above step 205.

The method of designing the metasurface of the present disclosure is described in detail above, and the method may be implemented by the corresponding devices. A device of designing a metasurface of the present embodiment will be described in detail below.

Figure 22:
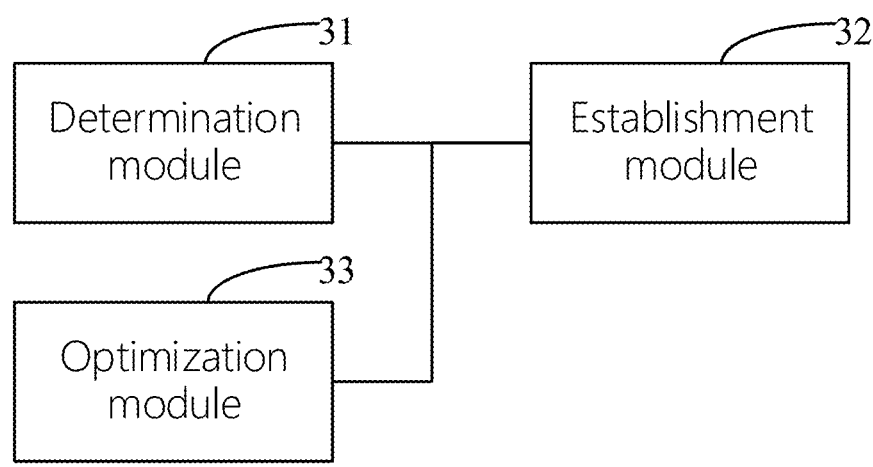
FIG. 22 schematically shows a structural diagram of a device of designing a metasurface according to an embodiment of the present disclosure.

FIG. 22 schematically shows a device of designing a metasurface according to an embodiment of the present disclosure. As shown in FIG. 22, the device of designing the metasurface includes a processor. The processor includes a determination module 31, an establishment module 32 and an optimization module 33.

The determination module 31 is configured to determine a phase distribution of an initial metasurface according to a preset image and a light source function of a first light source. The preset image represents a distribution schematic of speckles to be projected on a projection plane. The preset image includes a plurality of projection points in an array. A position of each projection point in the preset image is the same as a position of a center of each pattern projected on the projection plane. The first light source refers to a light source used in a design of the initial metasurface.

The simulation module 32 is configured to perform a simulation based on the phase distribution of the initial metasurface and a second light source, so as to obtain a speckle image. The second light source refers to a light source used in a measurement of the initial metasurface. The speckle image represents speckle patterns projected on the projection plane, obtained by passing light emitted by the second light source through the initial metasurface.

The optimization module 33 is configured to optimize the phase distribution of the initial metasurface through adjusting the projection points on the preset image if the speckle image does not meet a preset standard, so as to determine a target phase distribution. The optimization module 33 is also configured to generate the metasurface according to the target phase distribution.

Optionally, the first light source is a light source of emitting a plane wave, and the second light source is a light source array including at least one light source. The determination module 31 includes: a first determination sub-module for determining the diffraction phase distribution and a second determination sub-module for superimposing the collimation phase distribution.

The first determination sub-module for determining the diffraction phase distribution is configured to process the preset image and the plane wave by a G-S algorithm or an iterative Fourier transform algorithm, so as to determine a diffraction phase distribution of the initial metasurface.

The second determination sub-module for superimposing the collimation phase distribution is configured to superimpose a collimation phase distribution on the diffraction phase distribution to obtain the phase distribution of the initial metasurface.

Optionally, the initial metasurface includes a plurality of nanostructures. The collimation phase distribution satisfies:

$$\varphi_{i,1} = -\frac{2\pi}{\lambda}\left(\sqrt{r_i^2 + f^2} - f\right);$$

where, $\varphi_{i,1}$ represents a phase of an i-th nanostructure at a distance r; from a central point of the initial metasurface, and i=1, 2 . . . , n, n is a positive integer; $\lambda$ represents an operating wavelength of the initial metasurface; f represents a distance between the initial metasurface and a focal plane of the initial metasurface.

Optionally, each projection point has a numerical value. The numerical value of one projection point represents a light intensity coefficient of each speckle of one speckle pattern, with a position of the one projection point corresponding to a position of the one speckle pattern projected on the projection plane. The preset standard includes a requirement that a light intensity distribution of speckles in the speckle image is uniform. The optimization module 33 includes: a first optimization sub-module.

If the light intensity distribution of the speckles in the speckle image is not uniform, the first optimization sub-module is configured to optimize the phase distribution of the initial metasurface by varying numerical values of the projection points of the preset image.

Optionally, the first optimization sub-module is configured to perform a first loop optimization on the initial metasurface to obtain an optimized initial metasurface, until a speckle image that corresponds to the optimized initial metasurface meets the preset standard. The first optimization sub-module that performs the first loop optimization includes: a first adjustment unit, a first calculation unit, a first simulation unit and a first verification unit.

The first adjustment unit is configured to vary numerical values of a portion of projection points of the preset image used to obtain the initial metasurface, with positions of the portion of projection points corresponding to a region of the speckle image which does not meet the preset standard, so as to obtain an updated preset image.

The first calculation unit is configured to update the phase distribution of the initial metasurface based on the updated preset image and the light source function of the first light source.

The first simulation unit is configured to perform a simulation based on the updated phase distribution of the initial metasurface and the second light source to determine the updated speckle image.

The first verification unit is configured to verify whether a light intensity distribution of speckles in the updated speckle image is uniform. The first verification unit is also configured to take the updated phase distribution of the initial metasurface as the target phase distribution if the light intensity distribution of the speckles in the updated speckle image is uniform.

Optionally, the first verification unit is configured to confirm that the light intensity distribution of the speckles in the updated speckle image is uniform if a normalized light intensity difference corresponding to light intensities of the speckles in the updated speckle image is less than a preset threshold. The normalized light intensity difference is a uniformity parameter which indicates whether the light intensity distribution of the speckles in the updated speckle image is uniform.

Optionally, the normalized light intensity difference satisfies:

$$A = \frac{I_{max} - I_{min}}{I_{max} + I_{min}} \times 100\%;$$

where, A represents the normalized light intensity difference; $I_{max}$ represents a maximum light intensity among the light intensity distribution of the speckles in the updated speckle image; $I_{min}$ represents a minimum light intensity among the light intensity distribution of the speckles in the updated speckle image.

Optionally, the preset standard includes a requirement that the speckles of the speckle image are evenly distributed. If the speckle image does not meet the preset standard, the optimization module 33 includes a second optimization sub-module.

If the speckles in the speckle image are not evenly distributed, the second optimization sub-module is configured to optimize the phase distribution of the initial metasurface by adjusting a distance between adjacent projection points of the preset image.

Optionally, the second optimization sub-module is configured to perform a second loop optimization on the initial metasurface to obtain an optimized initial metasurface, until a speckle image that corresponds to the optimized initial metasurface meets the preset standard. The second optimization sub-module that performs the second loop optimization includes: a second adjustment unit, a second calculation unit, a second simulation unit and a second verification unit.

The second adjustment unit is configured to adjust the distance between the adjacent projection points of the preset image used to obtain the initial metasurface, so as to obtain an updated preset image.

The second calculation unit is configured to update the phase distribution of the initial metasurface based on the updated preset image and the light source function of the first light source, so as to obtain an updated phase distribution of the initial metasurface.

The second simulation unit is configured to perform a simulation based on the updated phase distribution of the initial metasurface and the second light source, so as to obtain an updated speckle image.

The second verification unit is configured to verify whether speckles in the updated speckle image are evenly distributed. The second verification unit is also configured to take the updated phase distribution of the initial metasurface as the target phase distribution if the speckles in the updated speckle image are evenly distributed.

Optionally, the optimization module 33 also includes: a third optimization sub-module.

The third optimization sub-module is configured to optimize the phase distribution of the initial metasurface by adjusting a focal length of the initial metasurface.

The simulation module 32 is configured to keep the second light source at a focal plane of the initial metasurface.

By the device of designing the metasurface provided in the present embodiment, a phase distribution of an initial metasurface is firstly determined according to a preset image and a first light source. Then, a simulation based on the phase distribution of the initial metasurface and a second light source is performed to obtain a speckle image. In the case that the speckle image does not meet a preset standard, the preset image is optimized by adjusting projection points on the preset image, so as to optimize the phase distribution of the initial metasurface. The aforementioned optimization is a loop optimization process which is iteratively performed until the speckle image obtained by the simulation meets the preset standard. The device provided herein essentially adjusts the preset image, so that the metasurface to be designed has a required modulation phase. By the combination of the simulation and speedy optimization, a phase distribution of the initial metasurface that meets the expected requirements, such as the target phase distribution, is obtained. Sequentially, based on the target phase distribution, the metasurface is generated, and the generated metasurface projects speckles with better performance.

It should be noted that the device of designing the metasurface implements the corresponding functions by functional modules as described above. However, the segmentation among the functional modules is only illustrative. In practical use, the above functions may be allocated to different functional modules as needed. That is, internal structures of the device are divided into different functional modules to complete all or a part of the functions described above. In addition, the device of designing the metasurface and the method of designing the metasurface in the embodiments as described above share the same concept. The specific implementation process of the device of designing the metasurface is similar to the method of designing the metasurface, and will not be repeated here.

According to one aspect of the present disclosure, a computer program product is provided. The computer program product includes a computer program including program code for executing a method shown in the flowchart. In an embodiment, the computer program may be downloaded from network via communications and may be installed. The computer program is executed by the processor to execute the method of designing the metasurface provided by the present embodiment.

In addition, a device of designing a metasurface is provided in the present embodiment. The device includes a processor and a memory. A computer program is stored in the memory. The processor is capable of executing the computer program. The computer program is executed by the processor to implement the method of designing the metasurface provided in any of the above embodiments.

Figure 23:
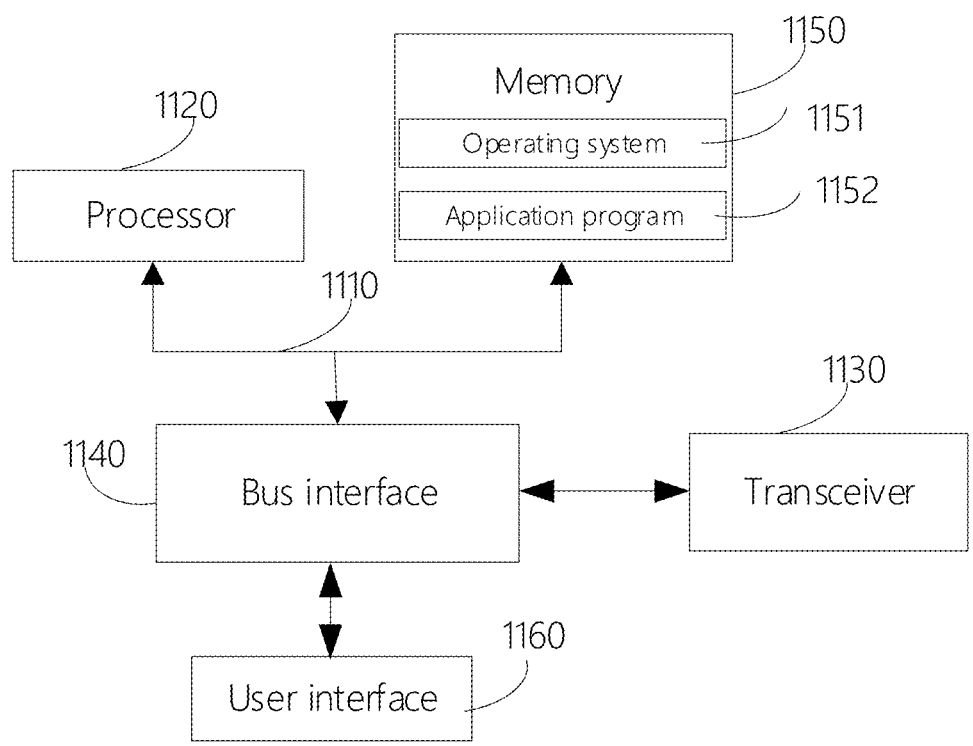
FIG. 23 schematically shows a structural diagram of a device of designing a metasurface according to an embodiment of the present disclosure.

For example, FIG. 23 shows a device of designing the metasurface according to an embodiment of the present disclosure. The device includes a bus 1110, a processor 1120, a transceiver 1130, a bus interface 1140, a memory 1150 and a user interface 1160.

In the present embodiment, the device further includes a computer program. The computer program is stored in the memory 1150 and is executable on the processor 1120. The computer program is executed by the processor 1120 to implement respective steps of the method of designing the metasurface as described above.

The transceiver 1130 is configured to receive and transmit data under the control of the processor 1120.

In the present embodiment, the bus 1110 represents a bus framework. The bus 1110 may include any number of interconnected buses and bridges. The bus 1110 is configured to connect various circuits of one or more processors represented by the processor 1120 and a memory represented by the memory 1150.

The bus 1110 represents one or more of any one of a plurality of types of bus structures. The bus 1110 includes a memory bus and a local bus of of any structure in a memory controller, a peripheral bus, an Accelerate Graphical Port (AGP), a processor or an architecture using various buses. For the purpose of illustration rather than limitation, the architecture includes an Industry Standard Architecture (ISA) bus, a Micro Channel Architecture (MCA) bus, an Enhanced ISA (EISA) bus, a Video Electronics Standards Association (VESA) bus, a Peripheral Component Interconnect (PCI) bus.

The processor 1120 may be an integrated circuit chip with signal processing capabilities. During the implementation processes, respective steps of the method described in the above embodiments may be completed by instructions in the form of integrated logic circuits in hardware or software in the processor. The processor may be a general-purpose processor, a Central Processing Unit (CPU), a Network Processor (NP), a Digital Signal Processor (DSP), an Application Specific Integrated Circuit (ASIC), a Field Programmable Gate Array (FPGA), a Complex Programmable Logic Device (CPLD), a Programmable Logic Array (PLA), a Microcontroller Unit (MCU) or other equipment such as a programmable logic device, a discrete gate, a transistor logic device, a discrete hardware component, which are capable of implementing or executing the method, respective steps and logical block diagrams disclosed in the present embodiment. For example, the processor may be a single-core processor or a multi-core processor. The processor may be integrated into a single chip or located on multiple different chips.

The processor 1120 may be a microprocessor or any conventional processor. The steps of the method disclosed in the present embodiment may be directly executed by a hardware decoding processor, or may be executed by a combination of a hardware module and a software module in a decoding processor. The software module may be provided in a readable storage media including Random Access Memory (RAM), Flash Memory (Flash Memory), Read-Only Memory (ROM), Programmable Read-Only Memory (PROM), Erasable PROM (EPROM) and a register, which are known in the art. The readable storage medium is located in the memory. The processor reads information in the memory and completes the steps of the method in combination with the hardware of the processor.

The bus 1110 may also realize the circuit connection of other devices such as peripheral equipment, a voltage regulator or power management circuit. The bus interface 1140 provides an interface between the bus 1110 and the transceiver 1130, which are known in the art. The general knowledge will not be described herein.

The transceiver 1130 may be an element or may be multiple elements, such as multiple receivers and multiple transmitters. The transceiver 1130 is configured to serve as a unit for communicating with various other devices over a transmission medium. For example, the transceiver 1130 receives external data from other devices, and the transceiver 1130 is used to send the processed data by the processor 1120 to other devices. Depending on the type of the computer system, a user interface 1160 may also be provided. The user interface 1160 may be a touch screen, a physical keyboard, a monitor, a mouse, a speaker, a microphone, a trackball, a joystick or a stylus.

It should be understood that in the present embodiment, the memory 1150 may further include memories remotely located relative to the processor 1120. The memories may be connected to a server through a network. One or more parts of the network may be an ad hoc network, an intranet, an extranet, a virtual private network (VPN), a local area network (LAN), a wireless local area network (WLAN), a wide area network (WAN), a wireless wide area network (WWAN), a metropolitan area network (MAN), Internet, a public switched telephone network (PSTN), a plain old telephone service (POTS) network, a cellular telephone network, a wireless network, a wireless fidelity (Wi-Fi) network or a combination thereof. The combination includes at least two kinds of networks listed herein. For example, the cellular telephone network and the wireless network may be a Global System for Mobile Communications (GSM), Code Division Multiple Access (CDMA), Worldwide Interoperability for Microwave Access (WiMAX), General Packet Radio Service (GPRS), a Broadband CDMA (WCDMA) system, a Long Term Evolution (LTE) system, an LTE Frequency Division Duplex (FDD) system, an LTE Time Division Duplex (TDD) system, a Long Term Evolution Advanced (LTE-A) system, a Universal Mobile Telecommunications (UMTS) system, an Enhanced Mobile Broadband (eMBB) system, a massive Machine Type of Communication (mMTC) system, an Ultra Reliable Low Latency Communications (uRLLC) system, etc.

It should be understood that the memory 1150 in the present embodiment may be a volatile memory, a non-volatile memory, or a combination thereof. Where, the non-volatile memory may be a Read-Only Memory (ROM), a Programmable ROM (PROM), and an Erasable PROM (EPROM), an Electrically EPROM (EEPROM) or a Flash Memory.

The volatile memory may be a Random Access Memory (RAM), which is used as an external cache. The RAM may be of various types. For the purpose of illustration but not limitation, the RAM may be a Static RAM (SRAM), a Dynamic RAM (DRAM), a Synchronous DRAM (SDRAM), a Double Data Rate SDRAM (DDRSDRAM), an Enhanced SDRAM (ESDRAM), a synchronous link DRAM (SLDRAM) or a Direct Rambus RAM (DRRAM). The memory 1150 described in the present embodiment may be any of memories listed herein or may be any of other appropriate memories, and the present embodiment is not limited thereto.

In the present embodiment, the memory 1150 stores the following elements of an operating system 1151 and an application program 1152, including an executable module and a data structure, a subset of the operating system 1151 and the application program 1152 or an extended set of the operating system 1151 and the application program 1152.

Specifically, the operating system 1151 includes a variety of system programs including a framework layer, a core library layer and a driver layer, which are used to implement various basic services and process hardware-based tasks. The application program 1152 includes a variety of application programs including a Media Player and a Browser, which are used to implement various application services. Programs of implementing the method of the embodiments of the present disclosure may be included in the application program 1152. The application program 1152 includes applets, objects, components, logic, data structures, and other computer-executable instructions that perform specific tasks or implement specific abstract data types.

In addition, the present embodiment also provides a computer-readable storage medium in which a computer program is stored. The computer program is executed by a processor, such that respective steps of the method of designing the metasurface are implemented and the same technical effect is achieved. Further details will not be discussed here for the purpose of avoiding repetition.

The computer-readable storage medium includes a medium that is permanent, non-permanent, removable or non-removable. The media is a tangible device being capable of reserving and storing instructions which are usable to an instruction execution device. The computer-readable storage medium may be an electronic storage device, a magnetic storage device, an optical storage device, an electromagnetic storage device, a semiconductor storage device, or a combination thereof. The computer-readable storage medium includes a phase-change random access memory (PRAM), a static random access memory (SRAM), a dynamic random access memory (DRAM), other types of random access memory (RAM), a read only memory (ROM), a Non-volatile random access memory (NVRAM), an electrically erasable programmable read-only memory (EEPROM), a flash memory or other memory techniques, a compact disc read-only memory (CD-ROM), a digital versatile disc (DVD) or other optical storage devices, a magnetic cassette storage device, a tape disk storage device or other magnetic storage devices, a memory stick, a mechanical encoding device (such as punched cards or raised structures in grooves in which instructions are recorded) or any other Non-transmission media, which are used to store information that is accessible by a computing device. According to the definition in the present embodiment, the computer-readable storage medium does not include a transient signal itself. The transient signal may be, for example, radio waves or other freely propagating electromagnetic waves, electromagnetic waves propagating through waveguides or other transmission media (such as light pulses passing through fiber optic cables) or an electrical signal transmitted through a wire.

It should be understood that the device, the equipment and the method provided in the embodiments of the present disclosure may be implemented in other ways. For example, the devices described above are only illustrative. Taking the modules or the units as an example, the division of modules or the units is performed according to logical functions. In actual implementation, there may be other division methods, for example, multiple units or multiple components may be combined or integrated into another system. Or, some features are ignored, or are not implemented. In addition, indirect coupling or direct coupling or communication connection as shown or as discussed may be realized by some interfaces, devices or units, or may be realized through electrical connection, mechanical connection, or connection in other forms.

The units described as separate components may or may not be physically separated. The components in the form of units may or may not be physical units, which may be located at one location or may be distributed to multiple network units. Some or all of the units may be selected according to actual needs to solve problems in the embodiments of the present disclosure.

In addition, respective functional units in the embodiments of the present disclosure may be integrated into one processing unit, or may be physical existences that are independent, or two or more units may be integrated into one unit. The integrated unit may be implemented in the form of hardware or software functional units.

The integrated unit may be stored in a computer-readable storage medium when the integrated unit is implemented in the form of software functional units, and is sold or used as an independent product. Based on this understanding, core parts of technical solutions or parts of the technical solutions that contribute to the prior art, or all or a part of the technical solutions of the embodiments of the present disclosure may be embodied in the form of a computer software product. The computer software product is stored in a storage medium and the computer software product includes a plurality of instructions. The plurality of instructions are configured to cause a computer device to execute all or a part of steps of the method described in the embodiments of the present disclosure, where the computer device may be a personal computer, a server, a data center or other network devices. The storage medium may be any of aforementioned mediums being capable of storing program code.

According to descriptions of the embodiments of the present disclosure, those skilled in the art should know that the embodiments of the present disclosure may be implemented in the form of the method, the device, the equipment and the storage media. Therefore, the embodiments of the present disclosure may be implemented in the following forms: complete hardware, complete software, or a combination of hardware and software. Where, the complete software may be a firmware, a resident software or a microcode. Furthermore, in some embodiments, the present disclosure may also be implemented in the form of a computer program product in one or more computer-readable storage mediums, where, the one or more computer-readable storage mediums contain computer program code.

The above-mentioned computer-readable storage medium may be any combination of one or more computer-readable storage mediums. The computer-readable storage medium includes electrical, magnetic, optical, electromagnetic, infrared or semiconductor systems, devices or equipment, or any combination thereof. More specifically, the computer-readable storage medium may be a portable computer disk, a hard disk, a random access memory (RAM), a read-only memory (ROM), an erasable and programmable read-only memory (EPROM), a flash memory, an optical fiber, a compact disk read-only memory (CD-ROM), an optical storage device, a magnetic storage device, or any combination thereof. In the embodiments of the present disclosure, a computer-readable storage medium may be any tangible medium in which a program is contained or stored. The program may be used by an instruction execution system, an instruction execution device, an instruction execution equipment or a combination thereof.

The computer program code included in the computer-readable storage medium may be transmitted by any appropriate medium, including wireless, wire, optical cables, radio frequency (RF), or any combination thereof.

Computer program code for performing steps of the embodiments of the present disclosure may be written in assembly instructions, instruction set architecture (ISA) instructions, machine instructions, machine-related instructions, microcode, firmware instructions, state setting data, integrated circuit configuration data, or in one or more programming languages or a combination thereof. The programming languages include object-oriented programming languages, such as Java, Smalltalk, and C++. The programming languages also include conventional procedural programming languages, such as C language or similar programming languages. The computer program code may execute on the user's computer entirely or partly, or may execute as a stand-alone software package, or may execute partially on the user's computer and partially on the remote computer, or may execute entirely on a remote computer or a remote server. In the case that the remote computer is involved, the remote computer may be connected to the user's computer or to an external computer over any kind of network, such as a local area network (LAN) and a wide area network (WAN).

In the embodiments of the present disclosure, the method, the device and the equipment are described through flow charts and/or block diagrams.

It should be understood that each block or any combination of the blocks in the flow charts and/or the block diagrams may be implemented by computer-readable program instructions. These computer-readable program instructions may be provided to a processor of a general-purpose computer, a special-purpose computer, or other programmable data processing apparatus to produce a machine. The computer-readable program instructions may be executed by the computer or other programmable data processing apparatus to produce a device which implements functions or operations specified by the blocks in the flow charts and/or the block diagrams.

The computer-readable program instructions may also be stored in a computer-readable storage medium that enables a computer or other programmable data processing apparatus to operate in a specific way. Such that, the computer-readable program instructions stored in the computer-readable storage medium produce a device including instructions to implement the functions or the operations specified by the blocks in the flow charts and/or the block diagrams.

Computer-readable program instructions may also be loaded onto a computer, other programmable data processing apparatus, or other devices, so that a series of operation steps are executed by the computer, the other programmable data processing apparatus, or the other devices, thereby producing a computer-implementable process. Thus, the instructions are executed on the computer or on the other programmable data processing apparatus, which enable the implementation of functions or operations specified by the blocks in the flow charts and/or the block diagrams.

The embodiments of the present disclosure mentioned above are illustrative, and are not intended to limit the present disclosure. The scope of the embodiments of the present disclosure is not limited thereto. All variations or substitutions that are easily thought of by those skilled in the art fall within the scope of the present disclosure. Accordingly, the scope of the present application is defined by the appended claims.

What is claimed is:

1. A method of designing a metasurface, comprising:
determining a phase distribution of an initial metasurface according to a preset image and a light source function of a first light source; the preset image represents a distribution schematic of speckles to be projected on a projection plane, and the preset image comprises a plurality of projection points in an array; a position of each projection point in the preset image is the same as a position of a center of each pattern projected on the projection plane; the first light source refers to a light source used in a design of the initial metasurface;
performing a simulation based on the phase distribution of the initial metasurface and a second light source, so as to obtain a speckle image; the second light source refers to a light source used in a measurement of the initial metasurface; the speckle image represents speckle patterns projected on the projection plane, obtained by passing light emitted by the second light source through the initial metasurface;
if the speckle image does not meet a preset standard, optimizing the phase distribution of the initial metasurface through adjusting the projection points on the preset image, so as to determine a target phase distribution; generating the metasurface according to the target phase distribution.

2. The method of designing the metasurface according to claim 1, wherein the first light source emits a plane wave, and the second light source is a light source array comprising at least one light source.

3. The method of designing the metasurface according to claim 2, wherein a step of determining the phase distribution of the initial metasurface according to the preset image and the light source function of the first light source comprises:

processing the preset image and the plane wave by a G-S algorithm or an iterative Fourier transform algorithm, so as to determine a diffraction phase distribution of the initial metasurface;

superimposing a collimation phase distribution on the diffraction phase distribution to obtain the phase distribution of the initial metasurface.

4. The method of designing the metasurface according to claim 3, wherein the initial metasurface comprises a plurality of nanostructures; the collimation phase distribution satisfies:

$$\varphi_{i,1} = -\frac{2\pi}{\lambda}\left(\sqrt{r_i^2 + f^2} - f\right);$$

wherein, $\varphi_{i,1}$ represents a phase of an i-th nanostructure at a distance $r_i$ from a central point of the initial metasurface, and i=1, 2 ..., n, n is a positive integer; $\lambda$ represents an operating wavelength of the initial metasurface; f represents a distance between the initial metasurface and a focal plane of the initial metasurface.

5. The method of designing the metasurface according to claim 1, wherein the preset standard comprises a requirement that a light intensity distribution of speckles in the speckle image is uniform.

6. The method of designing the metasurface according to claim 5, wherein each projection point has a numerical value, the numerical value of one projection point represents a light intensity coefficient of each speckle of one speckle pattern, with a position of the one projection point corresponding to a position of the one speckle pattern projected on the projection plane;

if the speckle image does not meet the preset standard, a step of optimizing the phase distribution of the initial metasurface by adjusting the projection points of the preset image, comprises:

if the light intensity distribution of the speckles in the speckle image is not uniform, optimizing the phase distribution of the initial metasurface by varying numerical values of the projection points of the preset image.

7. The method of designing the metasurface according to claim 6, wherein a step of optimizing the phase distribution of the initial metasurface by varying the numerical values of the projection points of the preset image comprises:

performing a first loop optimization on the initial metasurface to obtain an optimized initial metasurface, until a speckle image that corresponds to the optimized initial metasurface meets the preset standard.

8. The method of designing the metasurface according to claim 7, wherein the first loop optimization comprises:

varying numerical values of a portion of projection points of the preset image used to obtain the initial metasurface with positions of the portion of projection points corresponding to a region of the speckle image which does not meet the preset standard, so as to obtain an updated preset image;

based on the updated preset image and the light source function of the first light source, updating the phase distribution of the initial metasurface, so as to obtain an updated phase distribution of the initial metasurface;

performing a simulation based on the updated phase distribution of the initial metasurface and the second light source, so as to obtain an updated speckle image;

verifying whether a light intensity distribution of speckles in the updated speckle image is uniform; if the light intensity distribution of the speckles in the updated speckle image is uniform, taking the updated phase distribution of the initial metasurface as the target phase distribution.

9. The method of designing the metasurface according to claim 8, wherein a step of verifying whether the light intensity distribution of the speckles in the updated speckle image is uniform comprises:

if a normalized light intensity difference corresponding to light intensities of the speckles in the updated speckle image is less than a preset threshold, confirming that the light intensity distribution of the speckles in the updated speckle image is uniform; and the normalized light intensity difference is a uniformity parameter which indicates whether the light intensity distribution of the speckles in the updated speckle image is uniform.

10. The method of designing the metasurface according to claim 9, wherein the normalized light intensity difference satisfies:

$$A = \frac{I_{max} - I_{min}}{I_{max} + I_{min}} \times 100\%;$$

wherein, A represents the normalized light intensity difference; $I_{max}$ represents a maximum light intensity among the light intensity distribution of the speckles in the updated speckle image; $I_{min}$ represents a minimum light intensity among the light intensity distribution of the speckles in the updated speckle image.

11. The method of designing the metasurface according to claim 1, wherein the preset standard comprises a requirement that speckles in the speckle image are evenly distributed.

12. The method of designing the metasurface according to claim 11, wherein if the speckle image does not meet the preset standard, a step of optimizing the phase distribution of the initial metasurface by adjusting the projection points of the preset image, comprises:

if the speckles in the speckle image are not evenly distributed, optimizing the phase distribution of the initial metasurface by adjusting a distance between adjacent projection points of the preset image.

13. The method of designing the metasurface according to claim 12, wherein a step of optimizing the phase distribution of the initial metasurface by adjusting the distance between adjacent projection points of the preset image, comprises:

performing a second loop optimization on the initial metasurface to obtain an optimized initial metasurface, until a speckle image that corresponds to the optimized initial metasurface meets the preset standard.

14. The method of designing the metasurface according to claim 13, wherein the second loop optimization comprises:

adjusting the distance between the adjacent projection points of the preset image used to obtain the initial metasurface, so as to obtain an updated preset image;

based on the updated preset image and the light source function of the first light source, updating the phase distribution of the initial metasurface, so as to obtain an updated phase distribution of the initial metasurface;

performing a simulation based on the updated phase distribution of the initial metasurface and the second light source, so as to obtain an updated speckle image;

verifying whether speckles in the updated speckle image are evenly distributed; if the speckles in the updated speckle image are evenly distributed, taking the updated phase distribution of the initial metasurface as the target phase distribution.

15. The method of designing the metasurface according to claim 1, wherein a step of optimizing the phase distribution of the initial metasurface further comprises:

optimizing the phase distribution of the initial metasurface by adjusting a focal length of the initial metasurface.

16. The method of designing the metasurface according to claim 15, wherein a step of performing the simulation based on the phase distribution of the initial metasurface and the second light source to obtain the speckle image, comprises:

keeping the second light source at a focal plane of the initial metasurface.

17. An electronic device, comprising:

a processor and a memory, the memory comprises a computer program stored in the memory, wherein the computer program is executed by the processor, so as to implement the method of designing a metasurface of claim 1.

18. A non-transitory computer-readable storage medium in which a computer program is stored, wherein the computer program is executed by a processor, so as to implement the method of designing a metasurface of claim 1.

19. A device of designing a metasurface, comprising: a determination module, a simulation module and an optimization module;

the determination module is configured to determine a phase distribution of an initial metasurface according to a preset image and a light source function of a first light source; the preset image represents a distribution schematic of speckles to be projected on a projection plane, and the preset image comprises a plurality of projection points in an array; a position of each projection point in the preset image is the same as a position of a center of each pattern projected on the projection plane; the first light source refers to a light source used in a design of the initial metasurface;

the simulation module is configured to perform a simulation based on the phase distribution of the initial metasurface and a second light source, so as to obtain a speckle image; the second light source refers to a light source used in a measurement of the initial metasurface; the speckle image represents speckle patterns projected on the projection plane, obtained by passing light emitted by the second light source through the initial metasurface;

the optimization module is configured to optimize the phase distribution of the initial metasurface through adjusting the projection points on the preset image if the speckle image does not meet a preset standard, so as to determine a target phase distribution; and the optimization module is also configured to generate the metasurface according to the target phase distribution.

* * * * *